United States Patent
Bar-on et al.

(10) Patent No.: US 11,301,273 B2
(45) Date of Patent: Apr. 12, 2022

(54) COMPUTER USER INTERFACE FOR A VIRTUAL WORKSPACE HAVING MULTIPLE APPLICATION PORTALS DISPLAYING CONTEXT-RELATED CONTENT

(71) Applicants: Atlassian Pty Ltd., Sydney (AU); Atlassian Inc., San Francisco, CA (US)

(72) Inventors: Noam Bar-on, San Francisco, CA (US); Shilpa Modi, San Jose, CA (US)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/816,053

(22) Filed: Mar. 11, 2020

(65) Prior Publication Data
US 2021/0286633 A1    Sep. 16, 2021

(51) Int. Cl.
*G06F 9/451*    (2018.01)

(52) U.S. Cl.
CPC .................. *G06F 9/452* (2018.02)

(58) Field of Classification Search
CPC ....................................... G06F 9/452
See application file for complete search history.

(56) References Cited

U.S. PATENT DOCUMENTS

| | | | | |
|---|---|---|---|---|
| 7,225,139 B1* | 5/2007 | Tidwell | ............... | G06Q 10/10 705/7.15 |
| 7,613,689 B2* | 11/2009 | Arrouye | ............... | G06F 16/11 |
| 7,899,803 B2* | 3/2011 | Cotter | ............... | G06F 16/951 707/706 |
| 7,987,431 B2* | 7/2011 | Santoro | ............... | H04L 67/42 715/765 |
| 8,621,422 B1* | 12/2013 | Hsu | ............... | G06F 8/34 717/105 |
| 8,671,352 B1* | 3/2014 | Hsu | ............... | G06F 3/0484 715/762 |
| 8,706,841 B2* | 4/2014 | Gordon | ............... | H04N 21/23617 709/218 |
| 8,922,575 B2* | 12/2014 | Garside | ............... | G06F 3/033 345/557 |
| 9,020,565 B2* | 4/2015 | Flynt | ............... | G06Q 30/0276 455/566 |
| 9,043,712 B2* | 5/2015 | Santoro | ............... | G06F 3/0481 715/765 |
| 9,116,918 B1* | 8/2015 | Kim | ............... | H04N 21/278 |
| 9,286,390 B2* | 3/2016 | Marantz | ............... | G06F 16/951 |
| 9,450,952 B2* | 9/2016 | Alphin, III | ............... | G06F 3/0482 |
| 9,497,267 B1* | 11/2016 | Hoarau | ............... | H04L 67/42 |
| 9,715,485 B2* | 7/2017 | Roth | ............... | G06F 16/958 |

(Continued)

*Primary Examiner* — Jeremy L Stanley
(74) *Attorney, Agent, or Firm* — Brownstein Hyatt Farber Schreck, LLP

(57) ABSTRACT

A method for aggregating information whereby a user input provided to an input area within a graphical user interface is analyzed to determine an external application corresponding to a content portion of the user input. Analyzed content portions of the user input are used as an element in a search within the determined external application. As a result of the search within the determined external application, external content is obtained. The obtained external content is then categorized and organized into application portals displayed within the graphical user interface.

20 Claims, 17 Drawing Sheets

(56) References Cited

U.S. PATENT DOCUMENTS

| | | | |
|---|---|---|---|
| 9,883,007 B2* | 1/2018 | Tuli | G06F 3/167 |
| 10,423,691 B1* | 9/2019 | Patel | G06F 40/134 |
| 10,430,517 B1* | 10/2019 | Mulwad | G06F 9/453 |
| 10,614,061 B2* | 4/2020 | Kempf | G06F 16/2425 |
| 2002/0138582 A1* | 9/2002 | Chandra | G06Q 10/107 709/206 |
| 2002/0196273 A1* | 12/2002 | Krause | G06F 16/957 715/738 |
| 2004/0249786 A1* | 12/2004 | Dabney | G06Q 10/10 |
| 2005/0033772 A1* | 2/2005 | Atchison | G06Q 50/30 |
| 2005/0289133 A1* | 12/2005 | Arrouye | G06F 16/13 |
| 2006/0274086 A1* | 12/2006 | Forstall | G06F 16/958 345/629 |
| 2006/0277481 A1* | 12/2006 | Forstall | G06F 16/957 715/764 |
| 2007/0061486 A1* | 3/2007 | Trinh | G06F 16/9577 709/246 |
| 2007/0106952 A1* | 5/2007 | Matas | G06F 16/9577 715/764 |
| 2007/0118813 A1* | 5/2007 | Forstall | G06F 3/0488 715/805 |
| 2007/0162953 A1* | 7/2007 | Bolliger | G06F 16/4393 725/142 |
| 2007/0198741 A1* | 8/2007 | Duffy | G06F 16/957 709/245 |
| 2007/0266093 A1* | 11/2007 | Forstall | G06F 3/0486 709/204 |
| 2008/0082627 A1* | 4/2008 | Allen | G06Q 10/10 709/217 |
| 2009/0055749 A1* | 2/2009 | Chatterjee | H04M 1/72561 715/738 |
| 2009/0171950 A1* | 7/2009 | Lunenfeld | G06Q 30/0601 |
| 2009/0328025 A1* | 12/2009 | Johnson | G06F 8/71 717/170 |
| 2010/0031190 A1* | 2/2010 | Hall | G06F 16/9038 715/806 |
| 2010/0146555 A1* | 6/2010 | Komsi | H04N 21/4622 725/56 |
| 2010/0175011 A1* | 7/2010 | Song | G06F 9/543 715/769 |
| 2010/0198813 A1* | 8/2010 | Chi | G06F 16/951 707/722 |
| 2011/0040777 A1* | 2/2011 | Stefanov | G06F 16/951 707/767 |
| 2011/0107273 A1* | 5/2011 | Ranganathan | G06F 9/4881 715/854 |
| 2011/0202848 A1* | 8/2011 | Ismalon | G06F 16/958 715/738 |
| 2011/0276396 A1* | 11/2011 | Rathod | H04L 12/18 705/14.49 |
| 2011/0320458 A1* | 12/2011 | Karana | G06F 16/20 707/741 |
| 2012/0173520 A1* | 7/2012 | Wu | G06F 16/185 707/723 |
| 2013/0232240 A1* | 9/2013 | Purusothaman | H04L 43/14 709/220 |
| 2013/0346981 A1* | 12/2013 | Johnson | G06Q 10/109 718/100 |
| 2014/0129942 A1* | 5/2014 | Rathod | H04N 21/44222 715/720 |
| 2014/0172840 A1* | 6/2014 | Kumar | G06F 16/9535 707/723 |
| 2014/0181083 A1* | 6/2014 | Macho | G06F 3/04817 707/722 |
| 2014/0189572 A1* | 7/2014 | Martens | G06F 3/04817 715/780 |
| 2014/0195524 A1* | 7/2014 | Raichelgauz | H04H 60/56 707/722 |
| 2014/0337706 A1* | 11/2014 | Hsu | G06F 16/958 715/234 |
| 2014/0359490 A1* | 12/2014 | Ma | G06F 16/9535 715/760 |
| 2015/0088860 A1* | 3/2015 | Hamby | G06F 16/29 707/722 |
| 2015/0089353 A1* | 3/2015 | Folkening | G06F 8/38 715/234 |
| 2015/0186114 A1* | 7/2015 | Chirhart | G06F 8/30 717/110 |
| 2016/0103887 A1* | 4/2016 | Fletcher | H04L 41/22 707/722 |
| 2016/0110415 A1* | 4/2016 | Clark | G06F 16/332 707/774 |
| 2016/0154555 A1* | 6/2016 | Perrin | G06K 9/222 715/765 |
| 2016/0180438 A1* | 6/2016 | Boston | G06Q 30/0282 705/26.7 |
| 2016/0196579 A1* | 7/2016 | Koura | G06Q 30/0275 705/14.53 |
| 2016/0234624 A1* | 8/2016 | Riva | H04M 1/72522 |
| 2016/0283889 A1* | 9/2016 | Shukla | G06Q 10/063114 |
| 2016/0299902 A1* | 10/2016 | Uenoyama | H04W 4/70 |
| 2016/0373456 A1* | 12/2016 | Vermeulen | G06F 16/245 |
| 2016/0378761 A1* | 12/2016 | Lee | G06F 16/9535 707/706 |
| 2017/0070786 A1* | 3/2017 | Keene | G06F 3/0482 |
| 2017/0103129 A1* | 4/2017 | Lee | G06F 16/248 |
| 2017/0147658 A1* | 5/2017 | Yeom | G06F 40/134 |
| 2017/0169007 A1* | 6/2017 | Francis | G06F 3/0482 |
| 2017/0289073 A1* | 10/2017 | Crusson | G06Q 10/10 |
| 2017/0329468 A1* | 11/2017 | Schon | G06F 3/04845 |
| 2017/0337257 A1* | 11/2017 | Dole | G06F 16/90335 |
| 2018/0004823 A1* | 1/2018 | Kakhandiki | G06F 16/2455 |
| 2018/0024730 A1* | 1/2018 | Jambou | G06F 9/451 715/763 |
| 2018/0341685 A1* | 11/2018 | Indyk | G06F 16/00 |
| 2019/0012353 A1* | 1/2019 | Chaudhri | G06F 16/2428 |
| 2019/0065014 A1* | 2/2019 | Richter | G06F 3/0483 |
| 2019/0079978 A1* | 3/2019 | Ali | G06F 16/24573 |
| 2019/0130006 A1* | 5/2019 | Raviv | G06F 16/9032 |
| 2019/0230188 A1* | 7/2019 | Teng | H04L 63/08 |
| 2019/0391825 A1* | 12/2019 | Jann | G06F 3/0482 |
| 2020/0065355 A1* | 2/2020 | Hsu | G06F 30/00 |
| 2020/0074014 A1* | 3/2020 | Bakir | G06T 7/97 |
| 2020/0104415 A1* | 4/2020 | Satti | G06F 16/3325 |
| 2020/0106850 A1* | 4/2020 | Popowitz | H04L 67/2823 |
| 2020/0106871 A1* | 4/2020 | Lin | H04M 1/2746 |
| 2020/0150838 A1* | 5/2020 | Chauhan | H04L 63/08 |

* cited by examiner

COMPUTER USER INTERFACE FOR A VIRTUAL WORKSPACE HAVING MULTIPLE APPLICATION PORTALS DISPLAYING CONTEXT-RELATED CONTENT

TECHNICAL FIELD

Embodiments described herein relate to information aggregation systems and, in particular, to systems and methods for supplementing and contextualizing content input into a digital workspace by visually emphasizing recognized data types detected within the input content and/or displaying supplemental content related to the recognized data types.

BACKGROUND

Computing systems may execute services configured to assist users with various tasks. For example, a project management service may be configured to provide a user with information pertaining to a particular project and an email service may be configured to provide a user with a platform for sending and receiving email messages.

In many cases, however, users may be required (e.g., by an employer) to leverage a large number of discrete and independent services on a daily basis. As a result, significant productivity loss occurs due, in large part, to time and effort spent context switching between various services.

SUMMARY

Embodiments described herein relate to methods for reducing productivity loss due to context switching. A method for reducing productivity loss may be performed at least in part by a categorization service associated with a client device, such as described herein.

An example computer-implemented method described herein generates, at a client device, an input area within a graphical user interface. The input area may be configured to receive a user input within the graphical user interface. The computer-implemented method may receive the user input via the input area of the graphical user interface. The user input may be provided to the input area by a user leveraging an input device such as a mouse, a keyboard, or a touch screen.

A computer-implemented method, such as described herein, may include operations, such as, and without limitation: analyzing the user input to extract a content portion; identifying an external application from a set of external applications, the external application corresponding to the content portion; identifying context information based on the content portion; initiating a search within the external application based on the context information; and receiving, in response to the search, external content from the external application. An operation of a computer-implemented method, such as described herein, may additionally generate, at the client device, a set of application portals in the graphical user interface, each application portal of the set of application portals corresponding to at least one external application of the set of external applications. The computer-implemented method may direct a client device to display the external content within an application portion of the set of application portals, where the application portal is associated with the external application.

In some embodiments, a computer-implemented method described herein may include an operation that leverages a versioning service for differentiating specific versions of content input, edited, or otherwise provided by a user at different times within a graphical user interface. For example, an operation of a computer-implemented method may associate a first user input (and/or a hash thereof) with a first timestamp, where the first timestamp corresponds to a first time at which the first user input was provided to the input area.

The first user input and the first timestamp may be stored as a first version. At a different time, a second user input may be received via the input area (and/or another portion of a digital workspace) of the graphical user input and the second user input may be associated with a second timestamp corresponding to a second time when the second user input is input into the input area. A computer-implemented method may determine that the second user input exhibits a threshold similarity with the first user input and storing the second user input and the second timestamp in a second version if the threshold similarity is met.

In some embodiments, a computer-implemented method such as described herein may include an operation that analyzes an additional user input within the input area to extract an additional content portion. Operations of a computer-implemented method may, without limitation: identify additional external applications corresponding to the additional content portion; identify additional context information based on the additional content portion; initiate an additional search within the additional external applications based on the additional context information; receive an additional external content from the additional external applications in response to the additional search; generate, at the client device, an additional application portal in the graphical user interface, the additional application portal associated with one of the additional external applications; and may direct a client device to display the additional external content within the additional application portal.

In some embodiments, a computer-implemented method described herein may include an operation to display first external content within a first application portal when a user selects a first version and may display second external content within a second application portal when the user selects a second version.

An operation of a computer-implemented method may include: generating, at the client device, an additional application portal, the additional application portal configured to contain information related to an information type; analyzing a user input to extract a content portion; determining that the content portion is related to the information type; and directing a client device to display the content portion within the additional application portal.

In some embodiments, the user input may be at least one of a string of text, a hyperlink, a digital file, or an image.

A design of any application portal within the graphical user interface may mimic a user interface design of an associated external application.

In some embodiments, an organizational tool may be provided. The organizational tool may generate, at a client device, an input area in a graphical user interface. The input area may receive a first user input and a second user input. An organizational tool may, at a first time, receive the first user input in the input area of the graphical user interface; associate the first user input with a first timestamp corresponding to the first time; analyze the first user input to extract a first content portion; identify an external application corresponding to the first content portion; initiate a first search within the external application based on the first content portion; receive, in response to the first search, first external content from the external application; receive, at a second time, the second user input in the input area of the graphical user interface; associate the second user input with a second timestamp corresponding to the second time; analyze the second user input to extract a second content portion; determine whether the second content portion corresponds to the external application; initiate a second search within the external application based on the second content portion; receive, in response to the second search, second external content from the external application; generate, at the client device, an application portal in the graphical user interface, the application portal associated with the external application; display the first external content within the application portal when a user selects the first user input associated with the first timestamp; and direct a client device to display the second external content within the application portal when the user selects the second user input associated with the second timestamp.

An organizational tool may store a first user input a first version block and may store a second user input in a second version block. The first version block and the second version block may be displayed within the graphical user interface in a stacked form.

In some embodiments, an organizational tool may analyze a second user input to determine a similarity between a first user input and the second user input; determine a threshold similarity value; determine whether a similarity between the first user input and the second user input is above the threshold similarity value; store the first user input in a first version block; store the second user input in a second version block; and present the first version block and the second version block in a stacked form within the graphical user interface.

An organizational tool may analyze a second user input to determine a similarity between a first user input and the second user input; determine a threshold similarity value; determine a similarity between the first user input and the second user input is below the threshold similarity value; store the first user input in a first task block; store the second user input in a second task block; and present the first task block and the second task block as separate task blocks within the graphical user interface.

In some embodiments, a first user input may be a hyperlink and/or a deep link to the external application. The hyperlink may lead to a location in the external application that contains first external content.

A first user input and a second user input may be indexed into at least one of a primary index and a secondary index.

In some embodiments, the organizational tool may generate, at the client device, a search area configured to receive a search request from the user; receive the search request from the user; initiate a search of at least the first user input, the second user input, the first external content, and the second external content; and direct a client device to display, in the graphical user interface, segments of at least the first user input, the second user input, the first external content, and the second external content that correspond to the search request.

In some embodiments, a system for hosting an organizational tool may be provided. Such a system may include a storage medium that stores instructions and a processor that executes instructions. The instructions may include computer code that may direct a processor to: cause a client device to display a graphical user interface, the graphical user interface including an input area configured to receive a user input and a set of application portals; analyze the user input to extract a content portion; identify an external application corresponding to the content portion; identify context information based on the content portion; initiate a search within the external application based on the context information; and provide external content to the application portal, the external content gathered from the external application in response to the search.

In some embodiments, a processor may execute the instructions to: generate a second application portal of the set of application portals in the graphical user interface, the second application portal associated with an information type, analyze a user input to extract a second content portion; determine that the second content portion is related to the information type; provide the second content portion to the second application portal; and cause the client device to display the second content portion within the second application portal.

In some embodiments, the information type may be at least one of an email address, an email, a name, a link, a document, an image, a task, a calendar event, or a communication channel.

A processor may execute instructions to: generate a timeline in the graphical user interface, the timeline configured to store a first user input and a second user input; provide the first user input to a first block in the timeline of the graphical user interface and provide the second user input to a second block in the timeline of the graphical user interface.

A processor may execute the instructions to determine that a first user input and a second user input share a threshold similarity; stack a first block containing the first user input in a timeline with a second block containing the second user input in the timeline; and cause the client device to display a stack comprising the first block and the second block.

A processor may execute the instructions to determine that a first user input and a second user input do not share a threshold similarity; separate a first block containing the first user input in a timeline with a second block containing the second user input in the timeline; and cause the client device to display the first block and the second block as separate elements.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments and as defined by the appended claims.

The use of the same or similar reference numerals in different figures indicates similar, related, or identical items.

Figure 1:
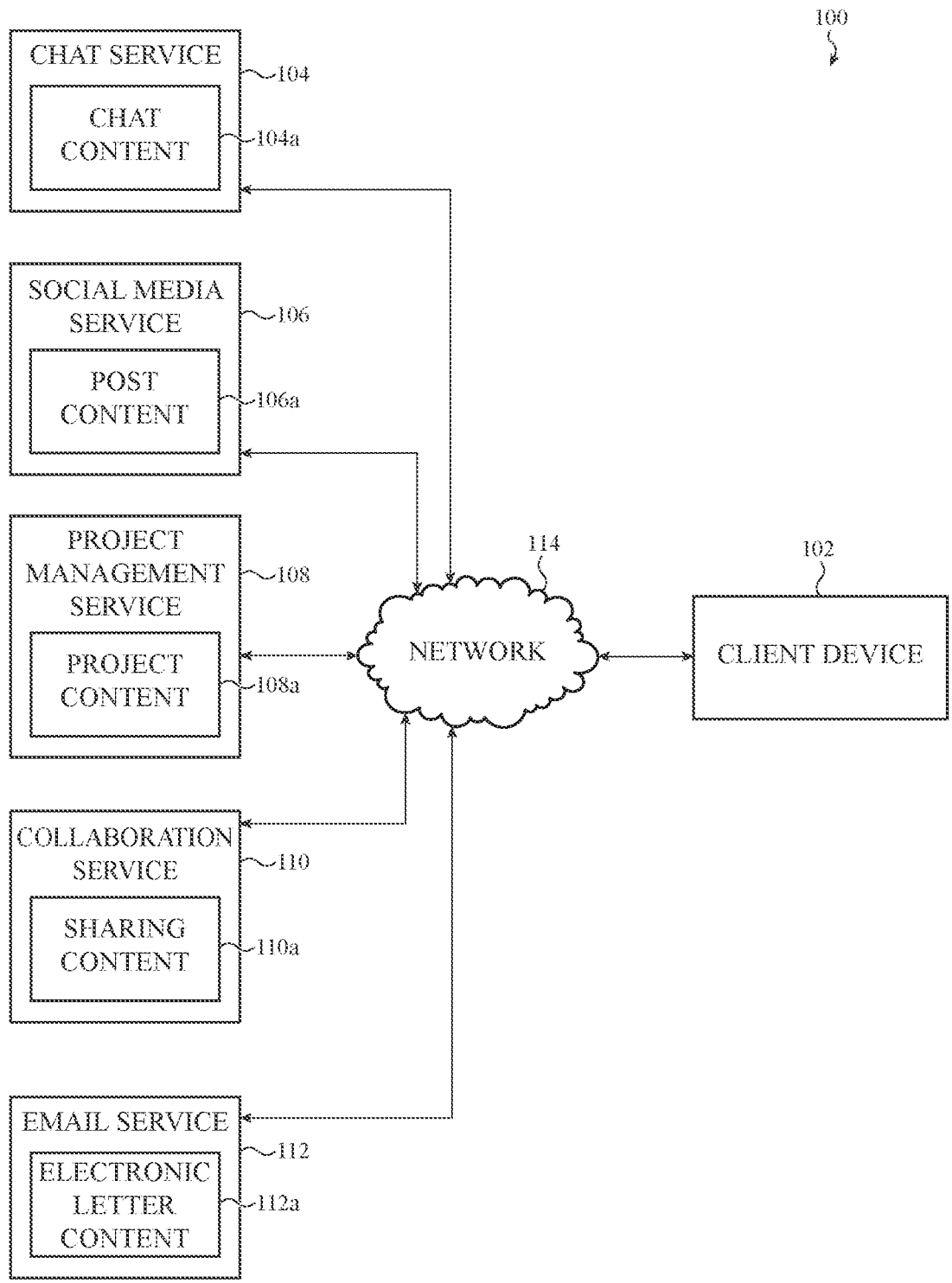
FIG. 1 depicts a schematic representation of a system, including an example client device, an associated network, and example software services, such as described herein.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein, may not necessarily be presented or illustrated to scale, and are not intended to indicate any preference or requirement for an illustrated embodiment to the exclusion of embodiments described with reference thereto.

DETAILED DESCRIPTION

In some embodiments, an information aggregation system, as described herein, may be provided to generate context-based content in a virtual workspace. An information aggregation system may collect scattered information from a set of external applications to allow a user of the information aggregation system to access and/or view the collected scattered information without directly visiting the set of external applications.

An example information aggregation system, as described herein, may include a digital or virtual workspace which receives content from a user (e.g., a user input). As described herein, a virtual workspace may be implemented in whole or in part as software executed by a virtual or physical server, or other computing appliance or combination of computing appliances. A virtual workspace may include a graphical user interface which may visually provide (e.g., by a display) multiple graphical elements to a user. An example of one such graphical element is an input area, which may be provided within a graphical user interface of a digital workspace and may be configured to receive a user input. Examples of a user input include text information, graphic information (e.g., images), audio information, video information, other multimedia information, and any other type of information.

In some embodiments, when a user of an information aggregation systems inputs information (e.g., a user input) into an input area of a virtual workspace, systems and methods such as described herein may analyze the input information (via, for example, a data detection operation) to autonomously collect, organize, and display content originally spread through a variety of external applications. As described herein, the virtual workspace includes a group or set of application portals (also referred to herein as categorization areas) that include content that is relevant to the user as he or she is working. One or more of the application portals may be associated with an external application that includes or is able to access a storage of content that is related or relevant to the user input entered into the input area.

In one example, a user can input a date (e.g., corresponding to a calendar date) and or a contact (e.g., a person's name) into an input area of an information aggregation system, the system may query and/or search a set of external applications (e.g., an email application, contacts, issue tracking system) and identify external content related to the input date and/or the contact. In this example, an email service accessible to the user may contain an email received on the input date and having the contact as an addressee or mentioned in the body of the e-mail. In this example, the system may: autonomously collect or copy the email; analyze and/or identify information within the email; and/or display the email and/or content within the email in a number of application portals or categorization areas. In this way, a user of the information aggregation system may obtain content from a set of external applications without interacting directly with the external applications.

As used herein, the term "autonomous" (and variants) is used to describe a function undertaken by an information aggregation system without direct user involvement, intervention, and/or control. For example, an autonomous search may be a search performed by an information aggregation system once a certain condition is met and may initiate without a direct user instruction. Such autonomous instructions may be provided in, for example, the computer code comprising any information aggregation system.

As described herein, a graphical user interface for an information aggregation system, may include a number of categorization areas also referred to as application portals. An application portal or categorization area may be provided proximate to an input area and may be configured to display and/or reference portions of a user input that correspond to particular content classifications. For purposes of this description, the term "categorization area" may be used to refer to a discrete window or region of content displayed on a virtual workspace. In some embodiments, the categorization area is associated with an external application (e.g., a software-as-a-service SAAS application) and may also be referred to herein as an "application portal." For example, an application portal may be associated with a chat channel, issue tracking system, or other external application and may display content extracted using or otherwise associated the external application. In some embodiments, the application portal may include content that is not associated with or extracted using an external application. For example, an application portal may include images or links that have been extracted directly from the input area or another region of the virtual workspace.

In one embodiment, a user may input a string of text that contains, or references, an appointment and a name (e.g., meet Robert at 12:05 PM tomorrow) into an input area, the information aggregation system may determine the presence (e.g., by leveraging a data detection operation, as discussed herein) of a name (e.g., Robert), a time (e.g., 12:05 PM in a local time zone), and a date (e.g., tomorrow). Thereafter, the name (e.g., Robert) may be isolated and/or displayed within a categorization area labeled "Names." Similarly, the time (e.g., 12:05 PM in the local time zone) and the date (e.g., tomorrow) may be isolated and may be displayed within a categorization area labeled "Calendar." In this way, bulk text content that a user inputs into an input area may be categorized, analyzed, supplemented with additional information, and displayed within a single graphical user interface.

In the above example, the input string of text (e.g., meet Robert at 12:05 PM tomorrow) may additionally initiate a search operation of the information aggregation system. For example, the input name (e.g., Robert) may direct the system to search a set of external applications for the name by, for example, searching a chat application for each time a user of the information aggregation system has spoken to anyone with the input name (e.g., the information aggregation system may perform an operation that searches an external chat application for any mention of the name "Robert"). Similarly, the input time and date may be included as part of a search term and the information aggregation system may direct a search that gathers any content related to the input date and time.

In some embodiments, a user may input a link (e.g., a hyperlink and a Uniform Resource Identifier) or reference to an external software program (e.g., a Software as a Service (SaaS) program) into an input area of a graphical user interface of an information aggregation system. An example link may refer to content stored and/or contained within a SaaS program. Once such a link to a SaaS program is input to an input area of a graphical user interface, an information aggregation system may use, for example, a data detection operation to determine that the input information is a link and may autonomously gather content and/or context from the SaaS program and may display the gathered content and/or context within a respective categorization area of the information aggregation system. Multiple such links may be input to the input area and may lead to a number of different SaaS programs. In this way, an information aggregation system may consolidate information from a number of different SaaS programs thereby allowing a user of the information aggregation system to avoid unnecessary context switching and to avoid the efficiency losses that are associated with context switching.

In some embodiments, an information aggregation system may utilize content contained within a user input to autonomously search processes within a background of a client device on which the information aggregation system is provided. For example, if a user were to input a date (e.g., Jan. 1, 2020) into a user input, an information aggregation system may search a client device (or any information available to the client device, including information stored within an external server connected to the client device via a network) for any references to Jan. 1, 2020 and may autonomously categorize such references as described herein. In the above example, a user's email account may contain an email referencing a lunch appointment on Jan. 1, 2020. This lunch appointment may be autonomously added to a respective categorization area (e.g., a categorization area labeled "Calendar") even if the lunch appointment was never directly input to an input area of an information aggregation system. In this way, the information aggregation system may provide a user with additional context beyond the context immediately available to the user.

In addition, in some embodiments, an information aggregation system may include a notification system and/or notification service configured to generate and deliver notifications, such as email notifications, banner notifications, and browser-based notifications, directed to one or more users of the system. In one example, a notification may be sent to an individual when the information aggregation system detects an approaching deadline. In another example, a notification can be sent to an individual when any individual with access to the information aggregation system inputs additional content into the system. In another example, a notification may be sent to an individual when a chat channel receives a new message.

It may be appreciated that these foregoing examples are not exhaustive. Any number of suitable process can be undergone by an information aggregation system, tool, or server, such as described herein. Similarly, any number of computing techniques can be used to develop or operate the information aggregation system.

These foregoing and other embodiments are discussed below with reference to FIGS. 1-11. However, those skilled in the art will readily appreciate that the detailed description given herein with respect to these figures is for explanatory purposes only and should not be construed as limiting.

FIG. 1 depicts a schematic representation of an example system 100 that may receive content from a variety of different external sources. In the illustrated embodiment, the system 100 includes a client device 102 connected to a number of external services (e.g., a chat service 104, a social media service 106, a project management service 108, a collaboration service 110, and an email service 112) via a network 114. The client device 102 may be any suitable personal or commercial electronic device and may include, without limitation or express requirement, a processor, a memory, and a display. Example electronic devices include laptop computers, desktop computers, cellular telephones (e.g., smart phones), tablet computing devices, and the like. As discussed herein, the client device 102 may be implemented in any suitable manner.

The network 114 may be any suitable communications network capable of commutatively coupling the client device 102 with external services. For example, in some embodiments the client network 114 may be a local area network (LAN) and may be physically connected to any of the provided services through physical cables and/or wires. In other embodiments, the network 114 may represent a public or private interconnected network (e.g., the Internet or an internal Intranet) and may comprise a number of wired and/or wireless signals to centralized or decentralized devices. In other embodiments, the network may include a combination of wireless and wired connections.

The chat service 104 may be any service designed to allow users to communicate via text, videos, or graphics. The chat service 104 may additionally collect and/or store information pertaining to a user's contact list (including, e.g., a screen-name/alter ego of other users and/or a legal name of other users). The chat service 104 may contain chat content 104*a* which has been collected and/or stored by the chat service 104. For example, the chat content 104*a* may include a user's contact list (including, e.g., a screen-name/alter ego of other users and/or a legal name of other users), channel information (e.g., a collection of users invited into a particular chat), metadata (e.g., a time, location, and date associated with a post), and communications between users as, for example, text and/or voice information. The communications between users may additionally be indexed and may be searchable by using, for example, keywords. The chat content 104*a* may, for example, relate to a work group where colleagues may discuss aspects about their job functions and/or deadlines.

The social media service 106 may be any service designed to publicly and/or privately share information to a variety of known and/or unknown users. For example, the social media service 106 may store, for example, text and/or voice information and may provide the input text and/or voice information to any other user with access to the social media service 106. The social media service 106 may contain post content 106*a* where a user can share packets of information (e.g., in the form of text, graphics, and audio). The post content 106*a* may relate to, for example, breaking news events and posts from individuals with a personal and/or professional relationship to a user of the client device 102. The post content 106*a* may contain the same and/or similar types of content as discussed above with respect to the chat content 104*a* and as discussed below with respect to content 108*a*-112*a*.

The project management service 108 may be any service designed to assist a company or individual in organizing and sharing tasks relating to the completion of a project. The project management service 108 may include calendar information (e.g., corresponding to a due date of a project) and may include keywords related to the project (e.g., project title information). The project management service 108 may contain project content 108*a* relating to, for example, tasks that a user must complete, deadlines, and shared tasks to be completed by another individual. The project content 108*a* may additionally include references to other digital locations. For example, the project content 108*a* may include references to word processing files (e.g., a link to a spreadsheet document) and may include hyperlinks to pages on a network (e.g., the Internet). The project content 108*a* may additionally contain the same and/or similar types of content as discussed above with respect to the chat content 104*a* and the post content 106*a* and as discussed below with respect to content 110*a*-112*a*.

The collaboration service 110 may be any service designed to make content created by one user available to any other user with authorization. The collaboration service may use a network (e.g., the network 114) to provide users access to the same, for example, word processing document, wiki, and/or information source. The collaboration service 110 may contain sharing content 110*a* relating to, for example, content derived from individuals external to the client device 102. The sharing content 110*a* may include, for example, information on each user with access to the collaboration service (e.g., as a contact list), metadata containing the date, time, and/or location of user edits, and indexed content input as text, audio, or as a graphic. The project content 110*a* may additionally contain the same and/or similar types of content as discussed above with respect to the chat content 104*a*, the post content 106*a*, and the project content 180*a* and as discussed below with respect to the electronic letter content 112*a*.

The email service 112 may be any service designed to send and receive electronic messages. The email service 112 may be personal to a specific user and may include content and context corresponding to messages that a user receives via electronic letters. The email service 112 may contain electronic letter content 112*a*. The electronic letter content 112*a* may include, for example, text, audio, and/or graphical information sent directly from one user to another (or from one user to another group of users). The electronic letter content 112*a* may additionally contain the same and/or similar types of content as discussed above with respect to the content 104*a*-110*a*.

Though the above services (e.g., the chat service 104, the social media service 106, the project management service 108, the collaboration service 110, and the email service 112) are described as separate services, they are not limited as such. An application may provide many different services within one user interface. For example, an application may include both a chat service and a social media service.

As discussed herein, the client device 102 may obtain context from the various services 104-112 via the network 114. For example, the client device 102 may receive the chat content 104*a* from the chat service 104 and may receive the post content 106*a* from the social media service 106. In this way, a number of scattered data may be integrated into one platform where the otherwise scattered data may be easily accessible to a user of the client device 102, as discussed herein. In this way, a user may only utilize the system 100, and similar systems as described herein, and may not need to access each service 104-112 directly. In this way, productivity loss due to context switching may be reduced.

Figure 2:
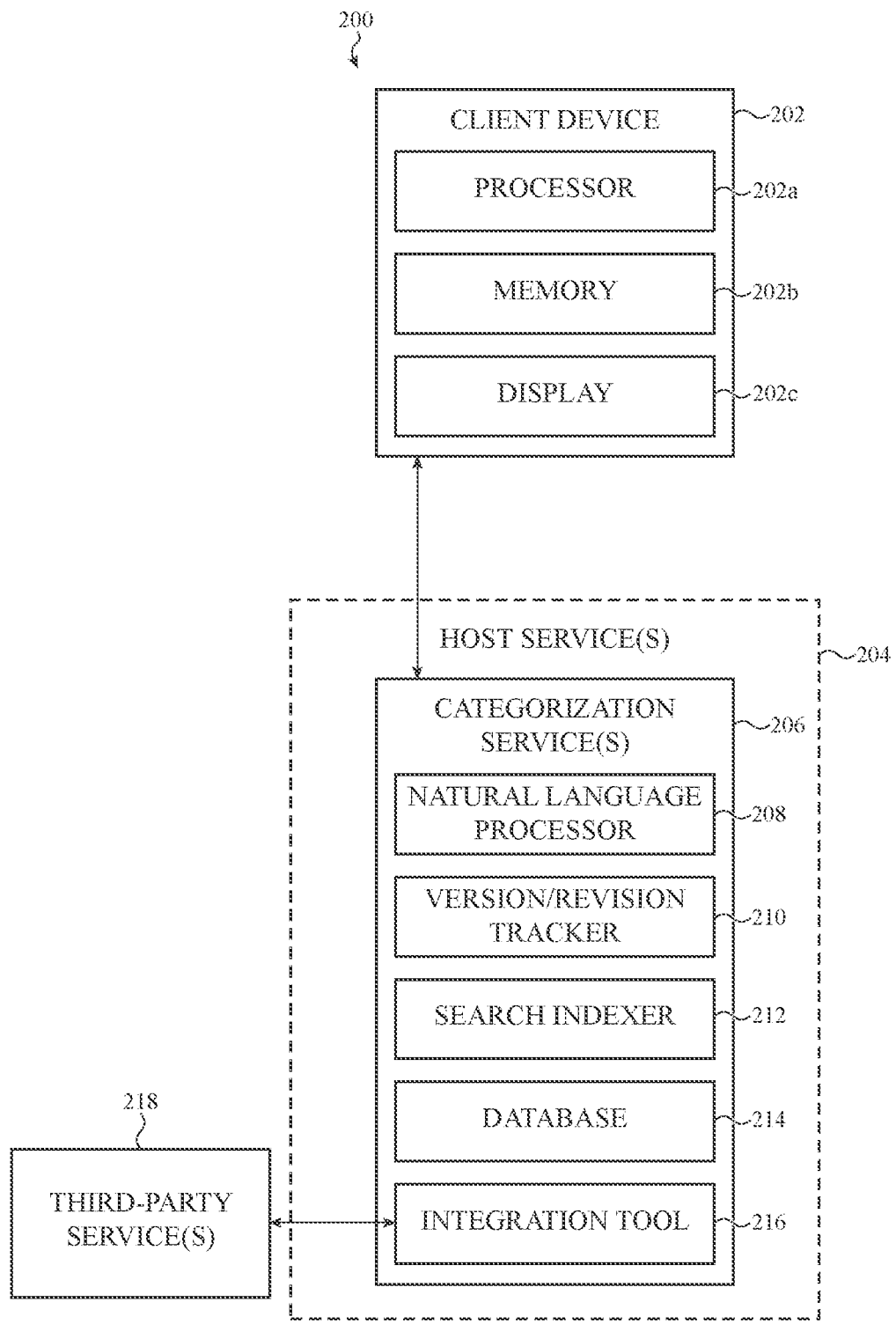
FIG. 2 depicts a schematic representation of an information aggregation system including example host services, such as described herein.

FIG. 2 depicts a schematic representation of an example implementation of an information aggregation system 200. Though the information aggregation system 200 is depicted in FIG. 2 as including a client device 202 and a third-party service(s) 218, the information aggregation system 200 is not limited thereto. In many embodiments, an information aggregation system may not include a client device and/or a third-party service(s) or may include elements not expressly noted in FIG. 2. In many embodiments, an information aggregation system 200 may include an application configured to access and communicate with the host service(s) 204.

In particular, FIG. 2 depicts an information aggregation system 200 in which a primary client device 202 is used to receive user input content, query external applications (e.g., as described with respect to FIG. 1) and/or to autonomously organize input content using an information aggregation application executed on the primary client device 202. The primary client device 202 may be any suitable personal or commercial electronic device and may include, without limitation or express requirement, a processor 202*a*, a memory 202*b*, and a display 202*c*. The primary client device 202 may be the same as the client device 102 as discussed with respect to FIG. 1. As discussed herein, the primary client device 202 may be implemented in any suitable manner.

The processor 202*a* of the primary client device 202 may be configured to execute an application, such as an information aggregation application, stored, at least in part, on the memory 202*b*. The information aggregation application may be configured to access and communicate with the host service(s) 204 and to transact information or data with, and to provide inputs to, the host service(s) 204. In some embodiments, the information aggregation application may be a browser application configured to access a web page or service hosted by the host service(s) 204 and may be accessible to the primary client device 202 over a private or public network (e.g., the Internet). In some embodiments, the information aggregation application may be an application on an electronic device, such as described herein.

In the simplified example provided in FIG. 2, the primary client device 202 may include a graphical user interface generated by an information aggregation application and that is displayed on display 202c. The display 202c may be a display of the primary client device 202 and/or may be a separate display that is projected or enlarged to be more easily viewed by a user of the primary client device 202. In certain embodiments, a user may interact with the graphical user interface directly through the display 202c (by, e.g., interacting with a touch screen). In further embodiments, the user may interact with the graphical user interface through a variety of input devices (e.g., a keyboard and a mouse).

In some embodiments, the host service(s) 204 may be configured to operate within or as a virtual computing environment that is supported by one or more physical servers, including one or more hardware resources such as a processor, a memory, non-volatile storage, networking connections, and the like. For simplicity of description and illustration, these example hardware resources are not shown in FIG. 2. In some embodiments, the host service(s) 204 can include a number of discrete subservices or purpose-configured modules, containers, or virtual machines each configured to perform, coordinate, serve, or otherwise provide one or more of the services, functions, or operations of the host service(s) 204.

In some embodiments, the categorization service(s) 206 of the information aggregation system 200 may be configured, at least in part, to organize, categorize, aggregate, or otherwise analyze content stored by the information aggregation system 200 in order to sort inputted information in a way that organizes the inputted information by type. In the illustrated embodiment, the categorization service(s) 206 may include a number of discrete subservices or purpose-configured modules, containers, or virtual machines each configured to perform, coordinate, serve, or otherwise provide one or more services, functions, or operations of the categorization service(s) 206. More particularly, the categorization service(s) 206 may include a natural language processor 208, a version/revision tracker 210, a search indexer 212, a database 214, and an integration tool 216. These subservices are merely explanatory and the information aggregation system 200 may include any number of additional or alternate subsystems.

The natural language processor 208 of the categorization service(s) 206 can be configured in any suitable manner to implement or otherwise perform the operation of providing natural language processing and/or determining a data type of inputted information. In one embodiment, a user may type text (e.g., sentences, words, or character strings) into an input area on the primary client device 202. For example, if a user inputs a string of numbers and slashes (e.g., 10/15/20), the natural language processor 208 may recognize the input as a date. In another example, if a user inputs a phrase (e.g., "Meet Matt M. at 9:30 AM tomorrow"), the natural language processor 208 may recognize the phrase as an appointment and pull out "9:30 AM" (as a time), "tomorrow" (as a date, recognized as a day after the user input the phrase), and "Matt M." (as a name). In the event that the natural language processor 208 recognizes a name (e.g., "Matt M.") the natural language processor 208 may communicate with other applications (e.g., a contacts list of the chat service 104) to find a full name of the referenced person.

The natural language processor 208 may broadly determine any type of input content using any type of natural language processing. For example, the natural language processor 208 may use named entity recognition (NER) processing (e.g., pre-trained, grammatical trained, and supervised models), sentiment analysis (e.g., naïve Bayes and lexicon-based methods), text summarization (e.g., extraction and abstraction, LexRank, Text Rank, and Latent Semantic Analysis), aspect mining, topic modeling (e.g., latent Dirichlet allocation and correlated topic model), and the like.

As discussed herein, a user may input content containing any type of information to the input area. The input content may contain a number of different portions, and these different portions may each correspond to a specific information type. For example, an information type may include, without limitation: a string of characters or words inserted as natural language; an image; a link to a web-service, an application, and/or a file location; a reference to a document or file (e.g., an external word processing document and a spreadsheet document); a calendar event; the body of an email; an email address; a person's name and/or title; a reference to an external chat/messaging application; a profile photo, icon, emoji, or avatar; a third-party service; one or more user identifiers; and a task. The natural language processor 208 may detect the presence of one or more of the above information types input into the input area. It may be appreciated that the foregoing examples are not exhaustive. Content input into an input area and containing data types, such as described herein, may include any suitable content or combination of content.

The natural language processor 208 may also analyze other kinds of content other than text. For example, the natural language processor 208 may analyze content such as videos, audio, images, links, and photos. For example, if a user inputs an image, the natural language processor 208 may be able to determine the presence of the image and may be able to determine a file type of the image (e.g., Portable Network Graphics (PNG) or JPEG) or a subject type (e.g., a picture of a tree or animal).

In some embodiments, a data detection operation may be utilized in order to analyze the content input into an input area (e.g., to detect the presence of content pertaining to a respective categorization block). The data detection operation may leverage any suitable method to determine a category and/or information type for content input into an input area including, but not limited to: determining file extensions; leveraging regular expressions for known syntax types; leveraging trained predictive models/artificial intelligence algorithms; and the like. In many cases, the data detection operation may be further configured to determine dependencies listed or otherwise referenced in a given user input.

The version/revision tracker 210 of the categorization service(s) 206 may be configured in any suitable manner to implement or otherwise perform the operation of assigning timestamp information to input content and/or marking input content with information pertaining to the time/date that the input content was created and/or input to an input area (e.g., as metadata). In some embodiments, the version/revision tracker 210 may keep track of edits that a user makes to input content. In some embodiments, the version/revision tracker 210 may permit switching between different versions of input content. For example, if a user types in a calendar appointment (e.g., "Project A due 9/30/19") and later edits the calendar appointment (e.g., "Project A & B due 9/30/19"), the version/revision tracker 210 may store both the original calendar appointment and the subsequent edit.

The version/revision tracker 210 may additionally display both the original calendar appointment and the edit to the user by way of a graphical user interface and/or may permit the user to switch between the two different versions. For example, if a user selects the original calendar appointment, the selected date (in the above example, 9/30/19) may only be associated with "Project A due." However, if a user selects the edited calendar appointment, the selected data may be associated with "Project A & B due." The above example is merely exemplary. Other instances where multiple versions of a user input are stored, processed, and/or analyzed are considered. In some embodiments, the version/revision tracker 210 may operate in conjunction with the natural language processor 208 to determine whether a subsequent user input is substantially similar to a previous user input.

In some embodiments, content input into an input area may additionally be associated, via the version/revision tracker 210, with a timestamp which may, in turn, be associated with metadata information. The timestamp may include a day, month, year, and time of an instance of where an individual input a certain piece of content into the input area. When the input content is sorted and/or stored into a respective categorization area, such as described herein, the timestamp associated with the user input may be visually presented to a user via a graphical user interface or may be hidden from the user's view as, for example, metadata. FIG. 7 and the associated description depicts and describes a possible operation of the version/revision tracker 210.

The search indexer 212 of the categorization service(s) 206 may be configured in any suitable manner to implement or otherwise perform the operation of indexing input content to make the input content (and portions of the input content) easier to locate when undergoing a search operation. The search indexer 212 may use any kind of indexer used to sort and organize data including B trees, multilevel indices, sparse indices, and dense indices. The search indexer 212 may allow a user to perform a natural language search by using both terms found in stored data and terms not found directly in the stored data. For example, a user may search for the term "quarterly projections" to find each instance where the phrase "quarterly projections" was used. In another example, a user may search for "conversations from 6 weeks ago" to find all email or chat conversations that occurred six weeks before the search.

In some embodiments, a user-initiated search may be updated and/or retrieved in real time. For example, if a user starts typing "cal" the search indexer 212 may automatically complete the term as "calendar" and may pull up information pertaining to calendar content. This automatic completion may be based on predetermined common words (e.g. whenever "cal" is typed, "calendar" is automatically generated), may be trained based on user input, or may be some combination of the two. The information visually displayed to a user may also be updated in real time as a user completes a term. In the above example, a user typing "cal" may initially result in the system retrieving and displaying all information relating to "California." As the user continues typing, "calend" the information aggregation system 200 may retrieve and display all information relating to a calendar.

The search indexer 212 may additionally be provided with a search bar in a graphical user interface of the information aggregation system 200. Though referred herein as a "search bar," the precise shape, manner, and implementation of the search bar is not particularly limited. Any suitable interface for allowing a user to search through content within the information aggregation system is considered. A considered search may be a natural language search, a Boolean search, and the like. In an embodiment, a user may input natural language terms into a search bar to initiate a search process. A result of the search process may display information that corresponds to the user's search within a graphical user interface presented to the user.

When content is input to an input area, the search indexer 212 may index the inserted user input in order to optimize query performance. In some embodiments, the search indexer 212 may cause a database containing the input content to create a data structure, such as a B-Tree. Once the data structure is created, the search indexer 212 may sort the data structure in order to make a search more efficient. The precise manner of indexing input content is not limited to such a method. Any manner of storing and preparing input content for use in a search function may be used.

The database 214 may be configured in any suitable manner to implement or otherwise perform the operation of recording input content and/or may store predetermined rules and algorithms for controlling the operation of the information aggregation system 200. The database 214 may also store data and/or computer code for the natural language processor 208, the version/revision tracker 210, the search indexer 212, and/or the integration tool 216.

In some embodiments, an integration tool 216 may be provided to communicate with a third-party service(s) 218. The integration tool 216 may be any software, hardware, or combination thereof that gathers data from a source outside of the host service(s) 204, as, for example, depicted and described with respect to FIG. 1. For example, the integration tool 216 may pull content from Software as a Service (SaaS) applications and may integrate the pulled content into the categorization service(s) 206 in, for example, the database 214. As discussed herein, a user may insert a link to, for example, a third-party chat service, as an example of third-party service(s) 218. The integration tool 216 may recognize the link, follow the link, and may obtain data from the linked content and incorporate the data into the categorization service(s) 206.

In some embodiments, the integration tool 216 may implement, for example, features and designs of an external application. In an example, a user may input a link to a chat service of a third-party application service into an input area of a graphical user interface. Once such a link is input, a categorization area, as described herein, may be created mimicking the design and functionality of the third-party application. A user may then interact with the categorization area and may perform the operations that are possible within the third-party application itself. For example, if a user inserts a link to a chat service, a categorization area may be formed containing chat content stored within the chat service. The user may then interact with the chat channel in a manner similar to the way that an individual would directly interact with the third-party chat application.

In some embodiments, the integration tool 216 may, alone or in conjunction with one or more services like the natural language processor 208, identify and/or extract context from a user input. The integration tool 216 may identify a third-party service 218 that is likely to be associated with the extracted content. In some cases, the integration tool 216 may also facilitate a search or interface with one or more the third-party services 218 to obtain content from the respective third-party services 218 to be displayed in a categorization area or application portal of a graphical user interface, as described herein.

It may be appreciated that the foregoing simplified examples are not exhaustive of the various possible components, systems, servers, and/or modules that may be used by an information aggregation system, such as described herein. Accordingly, more generally and broadly, it may be appreciated that the information aggregation system 200 may be configured to provide a user with a method of analyzing and autonomously sorting content inserted into a digital workspace, such as described herein.

Figure 3:
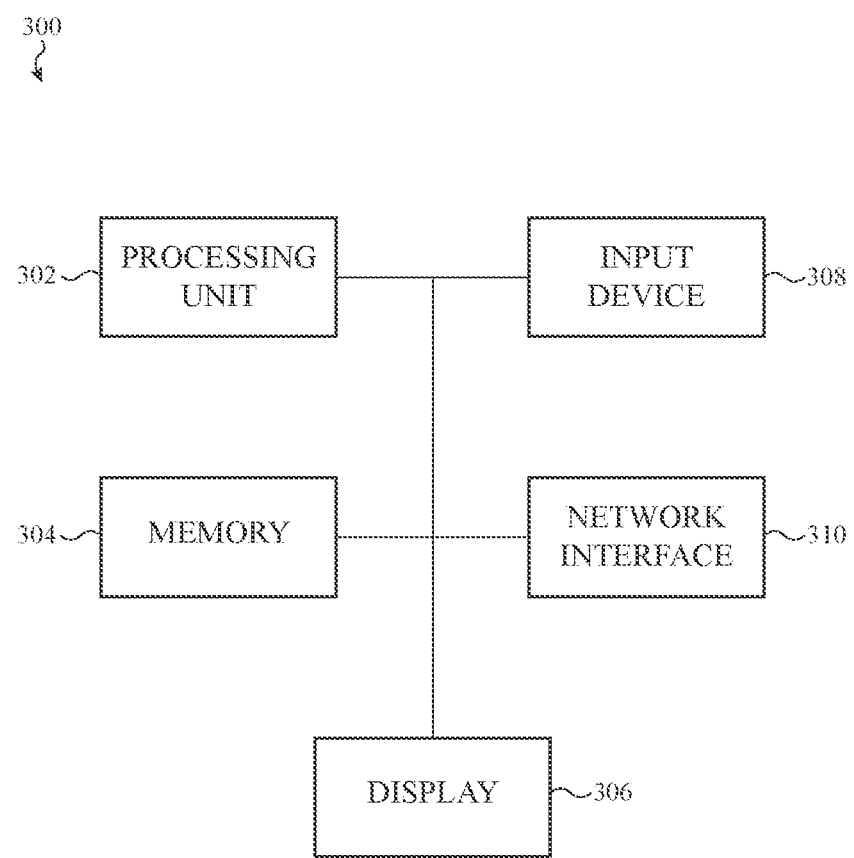
FIG. 3 is a functional block diagram of a computing device, such as described herein.

FIG. 3 is a functional block diagram of an embodiment of a computing device 300. The computing device 300 may correspond to any of the referenced client devices as described herein. The computing device 300 may include any appropriate hardware (e.g., computing devices, data centers, and switches), software (e.g., applications, system programs, and engines), network components (e.g., communication paths, interfaces, and routers), and the like for use in facilitating any operations disclosed herein.

As shown in FIG. 3, the computing device 300 may include a processing unit 302 operatively connected to memory 304, display 306, input device 308, and network interface 310. The aforementioned devices may be operatively connected via an electronic bus or bridge. Additionally, the connection may be wireless via, for example, wireless signals. The processing unit 302 may include a central processing unit (CPU) of the device. Additionally or alternatively, the processing unit 302 may include other processors within the device including application specific integrated chips (ASIC) and other microcontroller devices.

The memory 304 may include a variety of types of non-transitory computer-readable storage media, including, for example, read access memory (RAM), read-only memory (ROM), erasable programmable memory (e.g., EPROM and EEPROM), and flash memory. The memory 304 is configured to store computer-readable instructions (e.g., instructions for a data detection operation) and other persistent software elements. The memory 304 may also include a variety of types of non-transitory computer-readable storage media including, for example, a hard drive storage device, a solid state storage device, a portable magnetic storage device, or other similar device. The memory 304 may also be configured to store computer-readable instructions (e.g., instructions for a data detection operation) and other persistent software elements.

In this example, the processing unit 302 is operable to read computer-readable instructions stored on the memory 304. The computer-readable instructions may adapt the processing unit 302 to perform the operations or functions described herein. The computer-readable instructions may be provided as a computer program product, software application, and the like.

The computing device 300 may also include a display 306. The display 306 may include a liquid crystal display (LCD), organic light emitting diode (OLED) display, light emitting diode (LED) display, and the like. The display 306 may also include a backlight component that can be controlled to provide variable levels of brightness. The brightness of the display 306 may be controlled by modifying the electrical signals that are provided to display elements.

The input device 308 may transmit and/or receive data from a user or another electronic device. An input device 308 may include a display, a touch-sensing input surface, one or more buttons (e.g., a graphical user interface "home" button), one or more cameras, one or more microphones or speakers, one or more ports such as a microphone port, a mouse, and/or a keyboard. Additionally or alternatively, the input device 308 or port may transmit electronic signals via a communications network, such as a wireless and/or wired network connection. Examples of wireless and wired network connections include, but are not limited to, cellular wireless, wireless technology standards, infrared, and Ethernet connections.

The computing device 300 may also include a network interface 310 that is configured to transmit and/or receive signals or electrical communications from an external or separate device and/or program. The network interface 310 may be configured to couple to an external device via a cable, adaptor, or other type of electrical connector. In some embodiments, the network interface 310 may be used to couple the computing device 300 with an additional computing device and/or other appropriate accessories configured to send and receive electrical signals. The network interface 310 may be configured to receive identifying information from an external accessory, which may be used to determine a mounting or support configuration. The network interface 310 may also be used to commutatively couple the computing device 300 to external applications such as, for example, SaaS programs and third-party programs.

Figure 4:
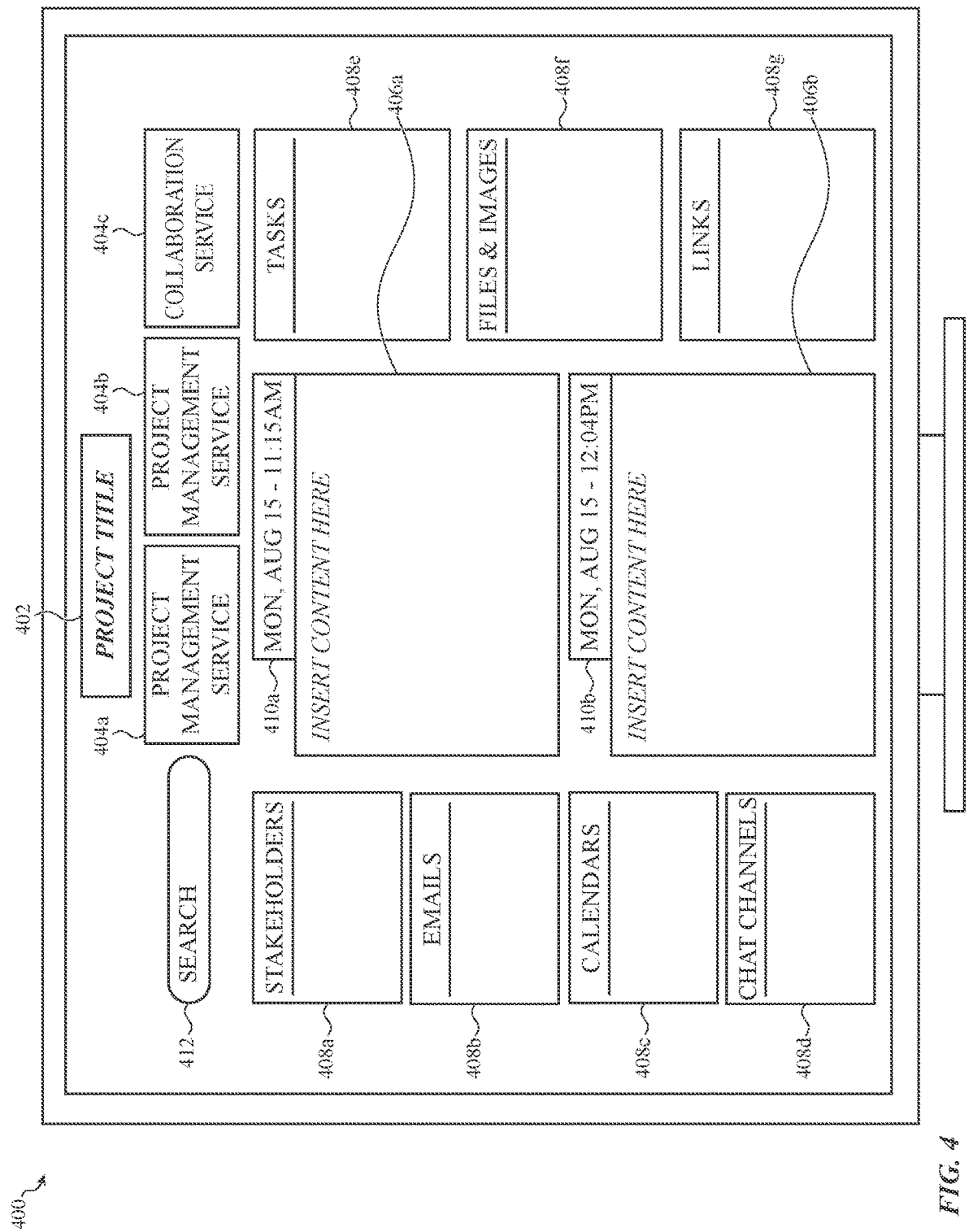
FIG. 4 depicts an example graphical user interface rendered by a display in an information aggregation system, such as described herein.

FIG. 4 depicts an example graphical user interface of an information aggregation system 400, in an embodiment. The information aggregation system 400 shows an example of the graphical user interface when a user is working on a project on a client device (e.g., the client devices depicted in FIGS. 1 and 2). The presented graphical user interface elements may be provided on a display (e.g., display 306) and may be generated using a processor (e.g., processing unit 302) based on instructions stored in a memory (e.g., memory 304). The graphical user interface may be manipulated by any number of input devices (e.g., input device 308).

The information aggregation system 400 may generate a title box 402, a first project management service 404a, a second project management service 404b, and a collaboration service 404c as graphical elements. The information aggregation system 400 may further present the generated graphical elements on a graphical user interface of a client device, as depicted in FIG. 4.

The presented services 404a-c may be links to an original document pertaining to the project or may be a link that opens an associated application. For example, in an information technology (IT) environment, one or more of the presented services 404a-c may be a link to an application comprising a ticket containing a problem that requires a solution. In another example, such as a legal litigation project, one or more of the presented services 404a-c may be a link to a legal document and/or a link to a document hosting service which contains legal documents. In the embodiment presented in FIG. 4, the collaboration service 404c may be a link to a collaborative work environment (e.g., a wiki and a collaboration application). Though services 404a-c comprise two project management services and one collaboration service in this embodiment, presented services 404a-c are not limited as such. The presented services 404a-c may be any service (e.g., SaaS services) that are relevant to a project on which a user is working.

In some embodiments, the presented services 404a-c may also be configured to dynamically vary, in real-time, in accordance with content input to any of the provided input areas 406a-b. For example, the information aggregation system 400 may analyze input content to determine the presence of a link and/or a reference to an external application. The information aggregation system 400 may also determine a likelihood that input content corresponds to an external application and may determine that input content does correspond to the external application when a threshold similarity value is met. The information aggregation system 400 may initiate a search within the external application and may direct a client device and/or a graphical user interface to display and/or present, within any of the presented services 404*a-c*, external content found within the external application. In some embodiment, the presented services 404*a-c* may operate in a manner similar to the application portals and/or categorization areas 408*a-g* such as described herein.

A search function 412 may additionally be provided in the information aggregation system 400. As discussed with reference to the search indexer 212 in FIG. 2, the information aggregation system 400 may index any content (e.g., images and text) input to the input areas (e.g., a first input area 406*a* and a second input area 406*b*). Once the input content is indexed, a user may type search terms into the search function 412 and the information aggregation system may display input content corresponding to the search terms (e.g., in any categorization area 408*a-g*).

The information aggregation system 400 may additionally be provided with a first input area 406*a* and a second input area 406*b*. The first input area 406*a* and the second input area 406*b* may be configured to accept a user input, such as a collection of text, an image, a link to an external SaaS service, and the like. Both the first input area 406*a* and the second input area 406*b* may comprise word processing technologies. As discussed with reference to FIG. 2, the first input area 406*a* and the second input area 406*b* may be communicatively coupled to a host service including, for example, a natural language processer, a version/revision tracker, a search indexer, a database, and an integration tool.

The first input area 406*a* may be associated with a first timestamp 410*a* and the second input area 406*b* may be associated with a second timestamp 410*b*. The first timestamp 410*a* and the second timestamp 410*b* may correspond to a time and/or date of when a user inserts any information into the respective input area. For example, if a user inserts text (e.g., "Appointment at 3 PM") into the first input area 406*a* on Monday, August 15th at 11:15 AM, then the first timestamp 410*a* may automatically populate with "MON AUG 15 11:15 AM." The automatically populated first timestamp 410*a* may additionally be edited by a user to a different time and/or date if desired.

In many implementations, the first input area 406*a* and/or the second input area 406*b* may be configured to accept a user input by a variety of control operations. For example, a user may insert content by, for example, typing on a keyboard or touch-sensitive screen, dragging-and-dropping an image, and/or pasting a link to a document, a service, and/or a website. The first input area 406*a* and/or the second input area 406*b* may operate as a word processing service, a spreadsheet service, a project management system, a wiki, any other service or program configured to receive content, either inputted by an individual or by an automated process, and/or any combination thereof.

As discussed herein, if a user inserts additional text into the first input area 406*a* at another date and/or time (e.g., on Tuesday, August 16th at 10:30 AM), the first timestamp 410*a* may be updated with the new date and/or time and may display "TUE AUG 16 10:30 AM." In the above example, though the original timestamp 410*a* (e.g., "MON AUG 15 11:15 AM") may no longer be visually displayed to the user, the original timestamp 410*a* may be stored and the user may switch between the two versions of the first input area 406*a* (see FIG. 7). The second input area 406*b* and the second timestamp 410*b* may operate in substantially the same manner as the first input area 406*a* and the first timestamp 410*a*.

The information aggregation system 400 may additionally be provided with a plurality of categorization areas 408*a-g* (e.g., application portals or supplemental information display areas). In the embodiment shown in FIG. 4, the categorization areas may include a stakeholder categorization area 408*a*, an email categorization area 408*b*, a calendar categorization area 408*c*, a chat channel categorization area 408*d*, a task categorization area 408*e*, a file & image categorization area 408*f*, and a link categorization area 408*g*. The precise labels and/or number of the categorizations areas is not limited. Any number of categorization areas may be provided with any label, shape, location, and the like.

Each one of the categorization areas 408*a-g* may be associated with their respective information types. For example, the stakeholder categorization area 408*a* may be associated with names of individuals. When a particular input area receives data that contains a name (or otherwise references content that contains a name, as discussed herein), the name may be, e.g., indexed, copied, and/or referenced and may be visually depicted in the stakeholder categorization area 408*a*. A similar process may occur for each of the other categorization areas 408*a-g* and, in this way, the categorization system may autonomously organize input content.

In some embodiments, the categorization areas 408*a-g* may display external content obtained from an external application. For example, a user input received via one of the first input area 406*a* or the second input area 406*b* may be analyzed to extract a content portion. The content portion may be analyzed by, for example, a data detection operation and the information aggregation system 400 may determine that the extracted content portion corresponds to an external application (e.g., a social media application, a chat application, a project management application, and the like).

The manner of analysis of the content portion is not limited to any particular method. In some embodiments, the information aggregation system 400 may detect the presence of a link to an external application (e.g., a hyperlink to a project management application) and may determine that the content portion is associated with the referenced external application (e.g., an express reference to an external application). In overlapping and/or alternative embodiments, the information aggregation system 400 may analyze the content portion to determine a likelihood that the content portion refers to a particular external application (e.g., an implied reference to an external application). In such an implied reference, the information aggregation system 400 may look for the presence of, for example, user names, ticket numbers, email addresses, and the like. For example, if the content portion contains a ticket number, the information aggregation system 400 may determine that the format of the ticket number corresponds to a particular external application. In this way, the context information (e.g., information that the information aggregation system 400 determines is associated with an external application) may be identified by the information aggregation system 400.

Once the context information is identified, the context information may be used to initiate a search within the identified external application. Once external content corresponding to the context information is found within the identified external application, the external content may be presented and/or displayed within an associated application portal/categorization area such as described herein.

Each of the number of categorization areas 408a-g may additionally be configured to be editable by a user (e.g., a user may change the dimensions, shape, position, and/or content of any one of the categorization areas 408a-g). In one example, the categorization areas 408a-g may be a list of collected information. Further, though the term categorization area may imply defined boundaries, the term is not intended to be limited thereto. The information contained in the categorization areas 408a-g may be visually provided to an individual without visual boundaries. In some embodiments, the categorization areas 408a-g may exist only in a virtual space and may not be visually provided to a user in a graphical user interface at all times (e.g., a user may hide any particular categorization area by minimizing and/or closing a window within the graphical user interface). The precise shape of the categorization areas 408a-g within the graphical user interface is not particularly limited. For example, the categorization areas 408a-g may be rectangular, circular, polygonal, or any other shape available on a graphical user interface. Each of a number of categorization areas 408a-g may be substantially the same size or may be different sizes.

In some embodiments, a user may input content directly into any one of the categorization areas 408a-g. In some embodiments, the content of each of any one of the categorization areas 408a-g may be autonomously populated directly from the first input area 406a and/or the second input area 406b. In these instances, a user may input content to a first input area 406a and/or a second input area 406b. The input content may be analyzed, as discussed herein, and such analysis may result in a detection of a number of information types that may be associated with a particular categorization area. Once any information type is detected in the inserted natural language, the information aggregation system 400 may copy or otherwise reference the information type and may insert the relevant content into the associated categorization area. In this way, content input by a user may be organized so that a user may easily see and obtain content of similar types.

In some embodiments, one of the categorization areas 408a-g may compile content from a number of the remaining categorization areas 408a-g. For example, if a user inputs content which is sorted into a stakeholder categorization area 408a and an email categorization area 408b, the information from both the stakeholder categorization area 408a and the email categorization area 408b may be compiled in a single window into the task categorization area 408e. In certain embodiments, this process may occur autonomously if a first timestamp associated with the content in the stakeholder categorization area 408a and a second timestamp associated with the content in the email categorization area 408b are sufficiently close in time and/or if the input content contains similar data types. In another considered embodiment, an individual may manually group such content into the task categorization area 408e by, for example, using a drag-and-drop technique.

The information type within each one of the categorization areas 408a-g may include a reference to the location of related information (e.g., a "pass by reference") or may include the content directly (e.g., a "pass by value"). It may be appreciated that the foregoing examples are not exhaustive. Content input into an input area and containing a particular information type, such as described herein, may include any suitable content or combination of content.

A user may copy or insert any information directly in the information aggregation system 400 or may provide references so that the information aggregation system 400 may find any information on another digital platform (e.g., by inputting a link to another virtual location). In some embodiments, once copied, inserted, or referenced information is analyzed and sorted by the information aggregation system 400, a user may select (e.g., by a clicking operation when using a mouse) the sorted information which may take the user to an original location of the information. For example, a user may input a link to a website in the first input area 406a and, once the link is sorted and categorized into a specific categorization area, the link may be selectable (e.g., clickable by a mouse) and may lead the individual to the referenced website.

Though only two input areas are depicted in FIG. 4, any number of input areas may be provided in the information aggregation system 400. For example, a scroll bar may be provided within the information aggregation system 400 so that a user may scroll through a number of different input areas. The categorization areas 408a-g may additionally be configured to contain information from each one of the input areas containing at least one known data type. In this way, even if a large number of input areas contain inputted information, a user may still be able to easily see and look through categorized data via the categorization areas 408a-g.

The first input area 406a and/or the second input area 406b may be provided to a user in any suitable manner. For example, the first input area 406a may be provided on a graphical user interface and may correspond to a window. The first input area 406a may be associated with metadata corresponding to, for example: a time when a user inputs content into the first input area 406a; notes that the user associates with the first input area 406a; a number of editable labels; a particular device from where the information was inserted; and information associated with the individual. The manner in which the first input area 406a is provided within the information aggregation system 400 is not particularly limited. Any suitable system or method for allowing a user to bring content into the information aggregation system 400 may be used.

Figure 5:
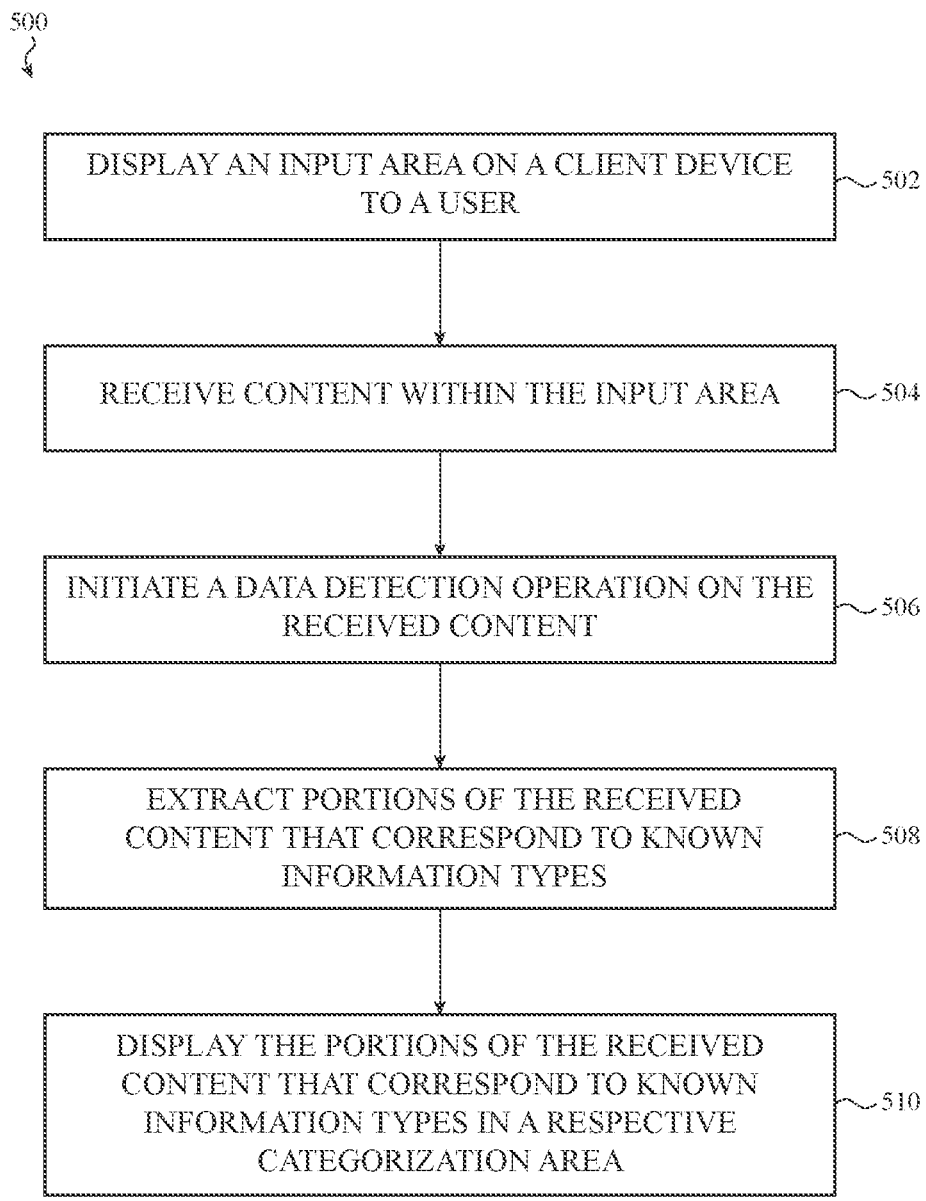
FIG. 5 is a flowchart that depicts example operations of an information aggregation system, such as described herein.

FIG. 5 is a flowchart that depicts an example categorization method 500 of an information aggregation system (e.g., the information aggregation system 400 depicted in FIG. 4), such as described herein. The method 500 may be performed by any hardware or software, whether virtual or otherwise, such as described herein. In one example, the method 500 is performed, in whole or in part, by a categorization service, such as described with reference to FIG. 2. The method 500 may control various operations of a client device (e.g., the client device 200). As described here, when a client device is described as displaying a particular graphical element, the graphical element may be generated by an application and/or processor on which any method described herein is located. In this way, the application and/or processor may direct a client device to display a certain generated graphical element. As discussed herein, graphical elements may be generated as a result of a processor and/or a method. After such graphical elements are generated, the graphical elements may be rendered to be displayed visually to a user (e.g., a graphical element may be rendered on a display of a client device).

At step 502, the method 500 initiates an operation that displays an input area to a user. The input area may correspond to the first input area 406a (or the second input area 406b) as discussed with reference to FIG. 4. The input area may be displayed on a client device (e.g., the primary client device 202 of FIG. 2). An information aggregation system and/or a processor, such as described herein, may perform an operation, or a series of operations, that generates an input area at a client device. The information aggregation system and/or the processor may use a series of instructions (e.g., computer code) to control an element (e.g., a display) of the client device, thereby visually presenting an input area to a user. As discussed herein, the input area may be configured to accept any kind of input from a user, including text, an image, a link, an animated picture, a video, and an audio clip.

At step 504, content is received within the input area. The received content may be input via, for example, a keyboard, a drag-and-drop operation, a cut-and-paste operation, and the like. The received content may be provided to an application (e.g., an information aggregation system) via the input area. For example, if a user uses a keyboard to input content to the input area, a signal from the keyboard may be provided to, for example, a memory, a processor, and/or an information aggregation system where the input content is received. Once the input area is generated, the input area may be rendered, by, for example, a client device and may be presented on a display of the client device. Once the input area receives the content, the content may be displayed within the input area.

At step 506, the method 500 initiates an operation that begins a data detection operation on the received content. The data detection operation may use any suitable method to determine a data type of the received content. For example, if a user inputs an image into the input area, the data detection operation may determine that an image is the element that was input. In another example, if a user inputs a string of slashes and numbers (e.g., 12/4/19), the data detection operation may determine that a date was input. The above examples are merely explanatory and other data detection operations, or other manners of analysis, may be performed.

At step 508, the method 500 initiates an operation that extracts portions of the received user input that correspond to known information types. In the embodiment shown in FIG. 5, known information types may be a person's name (e.g., stakeholders), an email address and/or message, a calendar appointment, a chat channel, a task, a file, an image, and a link. These known information types are merely explanatory and other information types may be implemented into the method 500.

At step 510, the method 500 initiates an operation that directs a client device (e.g., the client device 202) to display the portions of the received content that correspond to known information types in a respective categorization area. In one example, the received content may be a calendar invitation including a name, a date, a time, and a place. In this example, the data detection operation may detect the presence of the name and the method 500 may display the name within a categorization area labeled "Stakeholders." In the same example, the data detection operation may additionally detect the presence of a data, a time, and a place and display each of those elements within a categorization area labeled "Calendars." For a specific example of steps 508 and 510, see FIG. 7 below.

Figure 6:
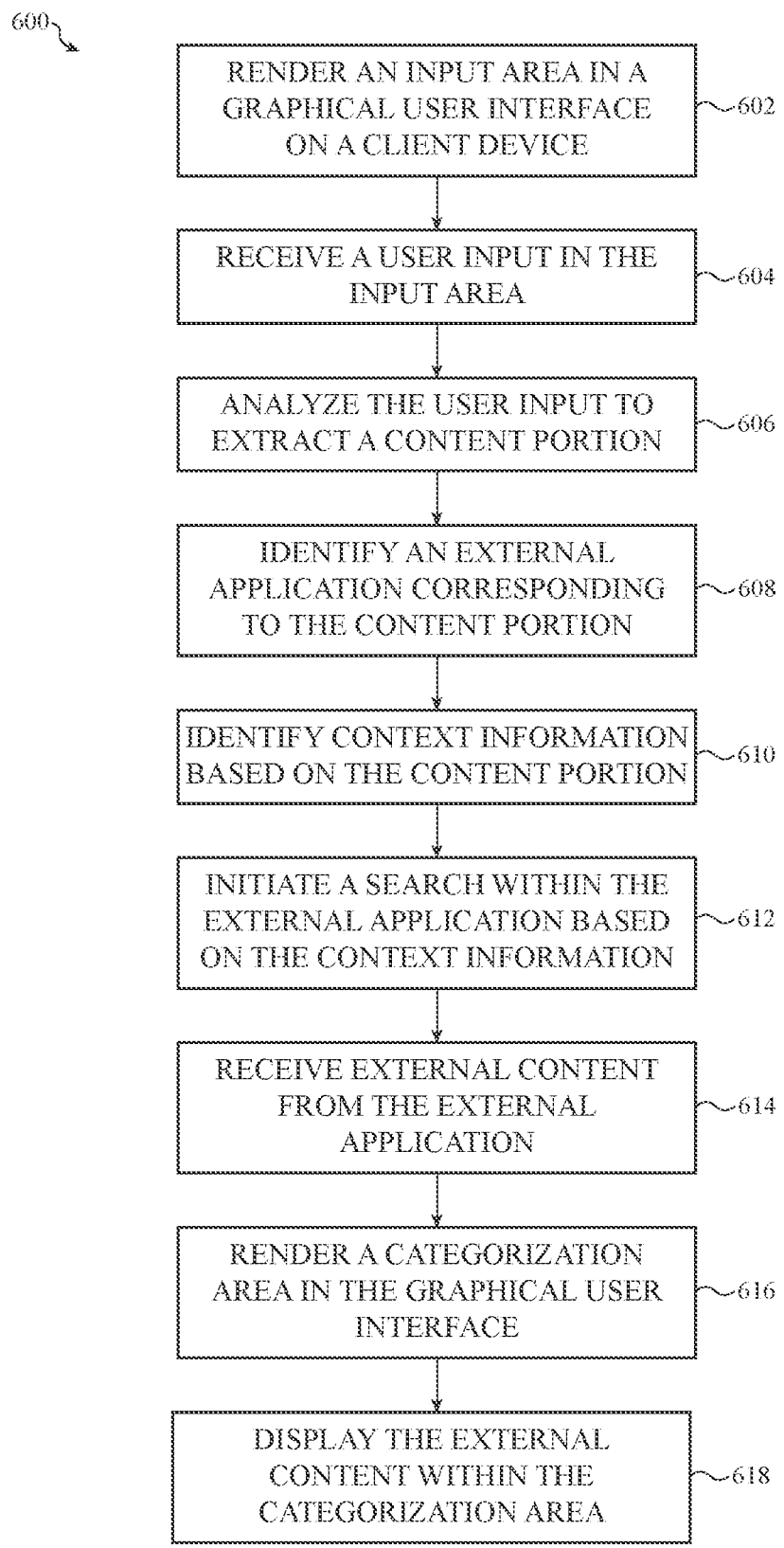
FIG. 6 is a flowchart that depicts example operations of an information aggregation system, such as described herein.

FIG. 6 is a flowchart that depicts an example operation of a categorization method 600 of an information aggregation system (e.g., the information aggregation system 400 depicted in FIG. 4), such as described herein. The method 600 may be performed by any hardware or software, whether virtual or otherwise, such as described herein. In one example, the method 600 is performed, in whole or in part, by a categorization service, such as described with reference to FIG. 2.

At step 602, the method 600 initiates an operation that generates an input area in a graphical user interface on a client device. The input area may correspond to the first input area 406a (or the second input area 406b) as discussed with reference to FIG. 4. An information aggregation system and/or a processor, such as described herein, may perform an operation, or a series of operations, that generates an input area at a client device. The information aggregation system and/or the processor may use a series of instructions (e.g., computer code) to control an element (e.g., a display) of the client device, thereby visually presenting an input area to a user. Once the input area is generated, the input area may be rendered, by, for example, a client device and may be presented on a display of the client device. As discussed herein, the input area may be configured to accept any kind of input from a user, including text, an image, a link, an animated picture, a video, and an audio clip.

At step 604, the method 600 initiates an operation that receives content within the input area. The received content may be input via, for example, a keyboard, a drag-and-drop operation, a cut-and-paste operation, and the like. The received content may be provided to an application (e.g., an information aggregation system) via the input area. For example, if a user uses a keyboard to input content to the input area, a signal from the keyboard may be provided to, for example, a memory, a processor, and/or an information aggregation system where the input content is received. Once the input area receives the content, the content may be displayed within the input area.

At step 606, the method 600 initiates an operation that analyzes the user input to extract a content portion. The manner of analyzing may be through the natural language processor 208 as depicted in FIG. 2. The content portion may correspond to an information type. For example, the content portion may be a name which the method 600 at step 606 isolates from the remainder of the user input.

At step 608, the method 600 initiates an operation that identifies an external application corresponding to the content portion. With reference to FIG. 1, the method 600 may determine which service 104-112 (or number of services 104-112) is the most likely to contain relevant information. For example, if a name was the content portion extracted at step 606, the method 600 may determine that email service 112 is the most likely to contain further information. This step 608 may use any number of analysis techniques, such as discussed herein.

At step 610, the method 600 initiates an operation that identifies context information based on the content portion. The context information may include search terms that are not directly present within the extracted content portion. For example, if a name was extracted at step 606, the context information may include locally available terms associated with the name (e.g., a telephone number). Additionally, the context information may include portions of the user input that was not extracted at step 606.

At step 612, the method 600 initiates an operation that develops and initiates a search within the identified external application (of step 608) based on the context information (of step 610). The context information may be used as a search term and may be used to perform a complete search within the external application. For example, if a name was extracted at step 606 and if the external application was identified as an email service, the method 600 may search through each email received by a user within the email service using the name as a search term.

At step 614, the method 600 initiates an operation that receives external content from the external application based on a result of the search initiated at step 612. In this way, relevant information may be obtained even if such relevant information was not directly input to the input area at step 604. In the example where a name was the extracted portion at step 606, the external content may be any email ever received by a user of the method 600 from the extracted name. In another example, the context information may limit the gathered external content by, for example, limiting the search only to emails received within a certain date range.

At step 616, the method 600 initiates an operation that generates a categorization area within the graphical user interface. An information aggregation system and/or a processor, such as described herein, may perform an operation, or a series of operations, that generates a categorization area at a client device. The information aggregation system and/or the processor may use a series of instructions (e.g., computer code) to control an element (e.g., a display) of the client device, thereby visually presenting an input area to a user. Once the categorization area is generated, the categorization area may be rendered, by, for example, a client device and may be presented on a display of the client device. The rendered categorization area may correspond to the received external content. For example, if emails were the received external content, the rendered categorization area may be labeled "Emails" and may be designed to contain email messages and/or references to email messages. In some embodiments, a number of categorization areas may be rendered and displayed. For example, in the above example a categorization area labeled "Names" may be rendered.

At step 618, the external content is displayed within the appropriate rendered categorization area, as shown in FIG. 7, herein. In this way, information within a number of different locations may be easily collected and displayed to a user of the method 600.

Figure 7A:
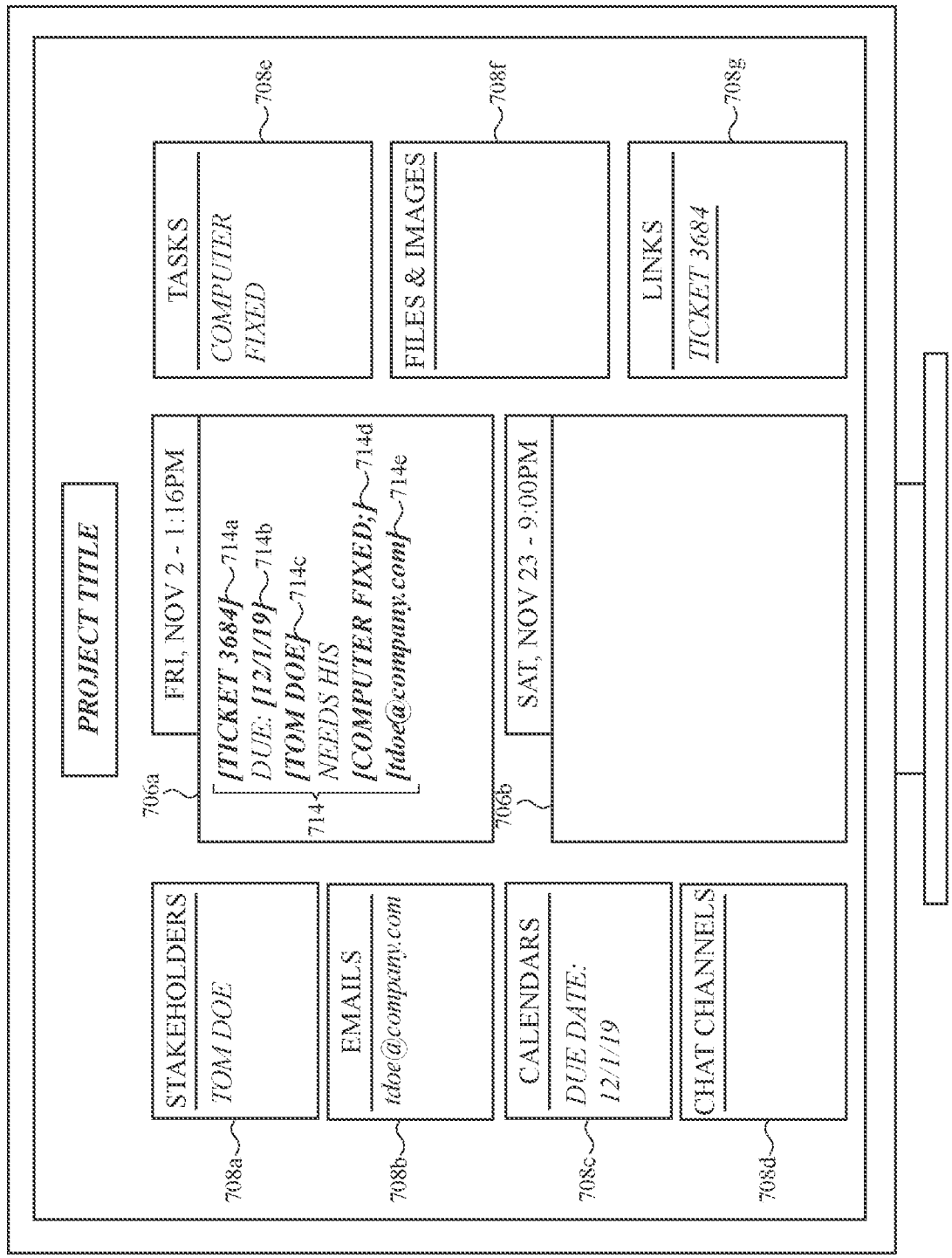
FIG. 7A depicts an example graphical user interface as rendered by a display in an information aggregation system, such as described herein.
Figure 7B:
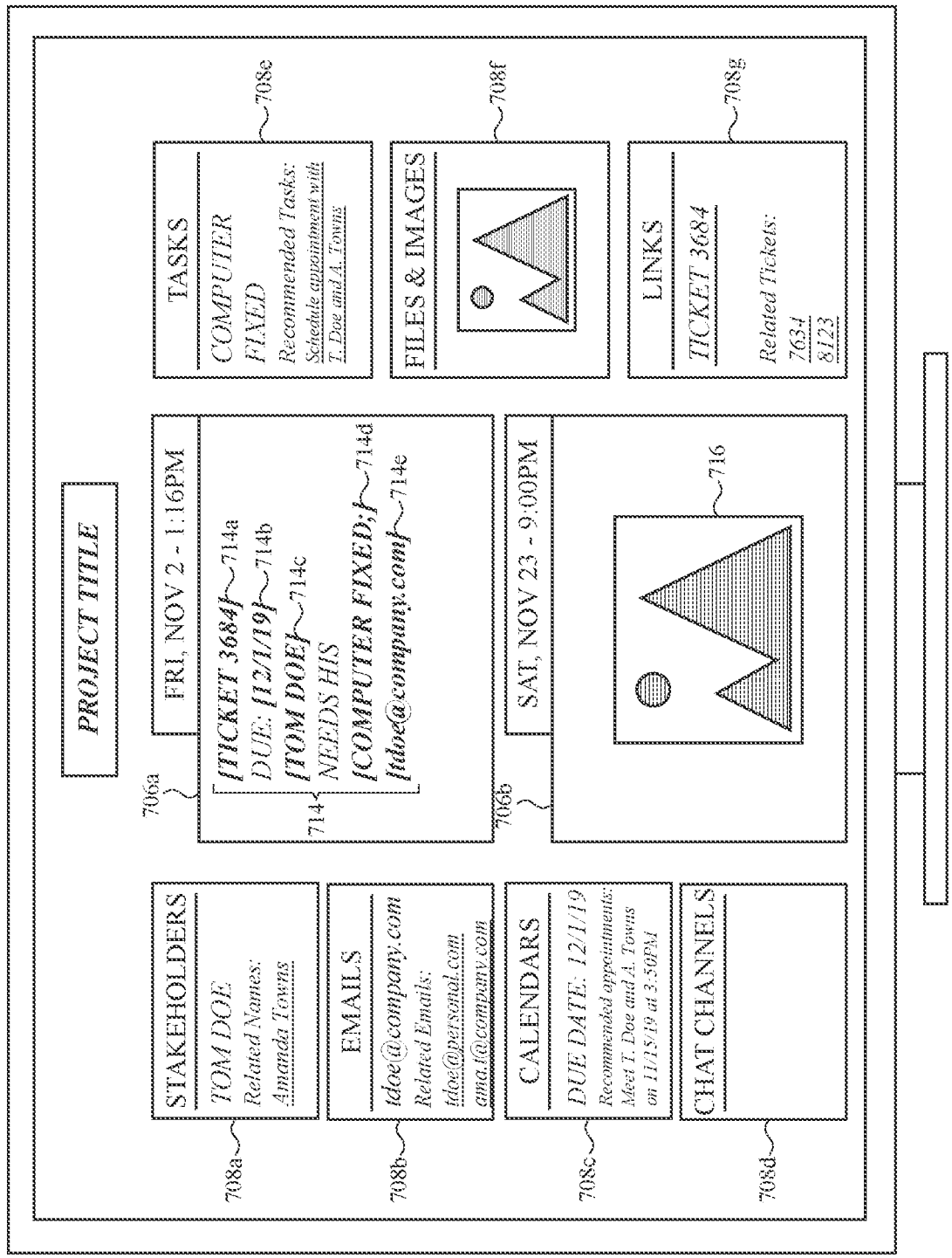
FIG. 7B depicts the example graphical user interface of FIG. 7A after additional information has been input by a user, such as described herein.
Figure 7C:
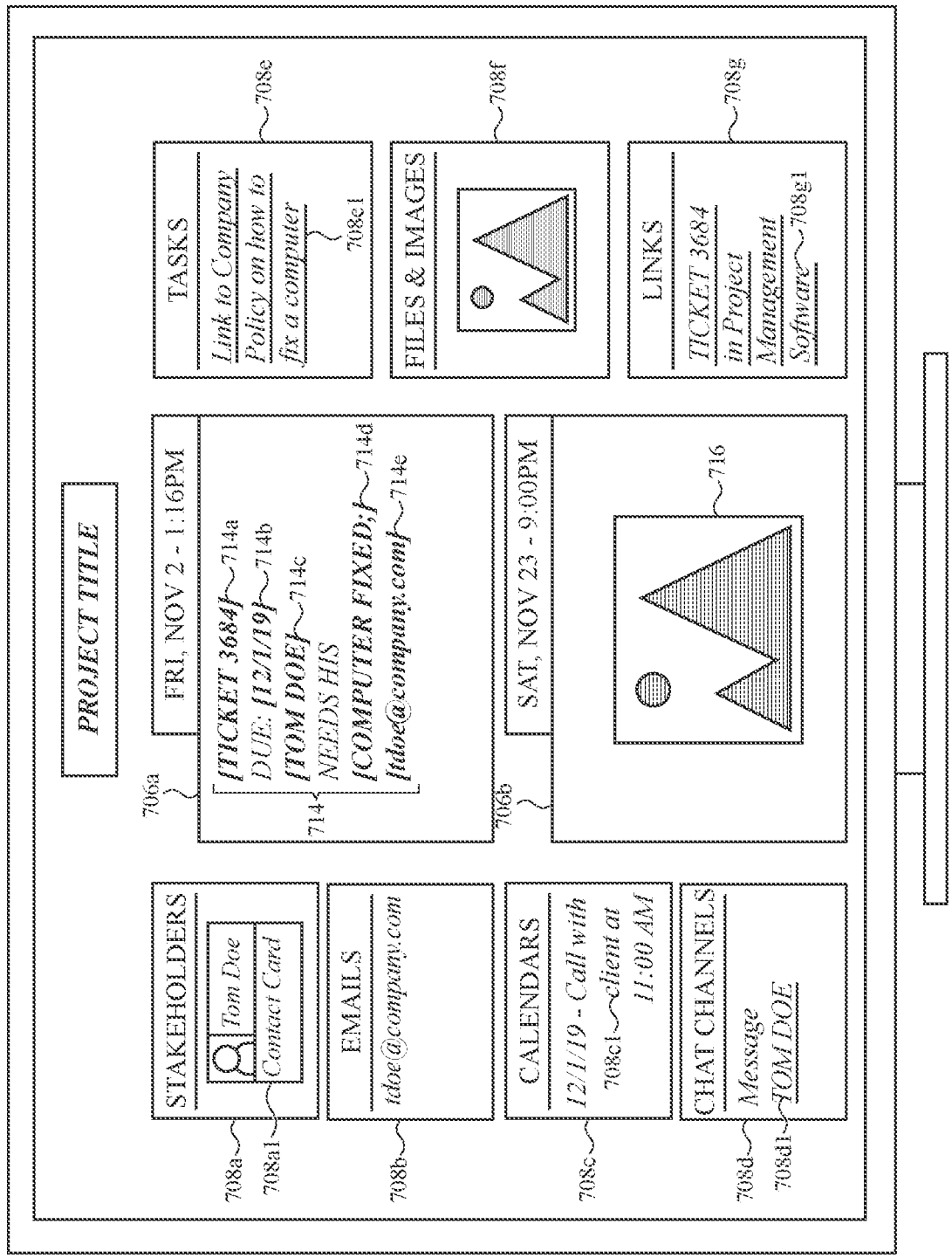
FIG. 7C depicts the example graphical user interface of FIGS. 7A and 7B after the information aggregation system identifies and gathers content from an external application, such as described herein.

FIGS. 7A-7C depict an example operation of the information aggregation system 700 in accordance with the embodiment depicted in FIG. 4. As each element depicted in FIG. 4 is not used for this example, certain labels are omitted from FIGS. 7A-7C for clarity.

In the example shown in FIG. 7A, a user has input a string of text 714 into a first input area 706a. The string of text 714 contains a number of information types that are recognized by a data detection operation (e.g., via natural language processor 208, see FIG. 2). Specifically, the string of text 714 includes a link 714a (a hyperlinked reference to Ticket 3684), a date 714b (12/1/19), a name 714c (Tom Doe), a task 714d ("computer fixed"), and an email address 714e (tdoe@company.com). Once these information types are recognized by the data detection operation, the information contained within the information types may be visually displayed within an associated categorization area 708a-g. In the provided example, the link 714a is detected as a clickable hyperlink to an external application/program. Thereafter, a copy or reference to the link 714a is autonomously placed within a link categorization area 708g. Similarly, the date 714b is recognized by the information aggregation system 700 as a date and a copy or reference to the date is autonomously placed within a calendar categorization area 708c. The same process occurs for the name 714c (autonomously placed within the stakeholder categorization area 708a), the task 714d (autonomously placed within the task categorization area 708e), and the email address 714e (autonomously placed within the email categorization area 708b). In this way, information input to the first input area 706a may be organized and provided to a user of the information aggregation system 700.

Though the information types recognized by the data detection operation are visually depicted with square brackets, italics, and bolding in FIGS. 7A-7C, this is only one possible implementation. In other embodiments, the information types may be visually displayed in a different color from non-recognized text, may be underlined, and/or may not be visually distinguished from non-recognized text.

FIG. 7B depicts the example graphical user interface of FIG. 7A with an image 716 within a second input area 706b. In this example, the image 716 may be detected by the information aggregation system 700 and may be determined to be a graphic (e.g., by natural language processor 208 and/or a data detection operation). The image 716 may then be placed (e.g., by reference or by value) in a file & image categorization area 708f. The image within the file & image categorization area 708f may be the same size as the original image 716 or may be resized to fit within the file & image categorization area 708f.

As depicted in FIG. 7B, the remaining categorization areas 708a-g may contain the same content as depicted in FIG. 7A. The addition of additional content in another input area (e.g., second input area 706b) does not affect the data visible in the respective categorization areas 708a-g. In this way, even if the information aggregation system 700 includes a large number of input areas (e.g., 25 or more input areas) that are not able to all be displayed on a single display, a user may still be able to quickly scan organized data collected from the large number of input areas.

The information aggregation system 700 may additionally perform a recursive search to obtain information related to a project even though such information was not directly input to the first input area 706a. For example, a user may input a name to the first input area 706a (e.g., Tom Doe). The information aggregation system 700 may use the name to search an external directory and may obtain a number of associated email addresses (e.g., the name "Tom Doe" may be used to search through a company directory and two email addresses, a work email address and a personal email address, may be found and provided within an email categorization area 708b). The obtained email addresses may then be used to search through collaboration services to obtain a collaboration account (e.g., Tom Doe's personal email address may be used to search collaboration services to find an account controlled by Tom Doe). Once, for example, a relevant collaboration account is found, the information aggregation system 700 may perform an additional search within the collaboration account to find additional users (e.g., coworkers) that the collaboration account (e.g., Tom Doe's collaboration account) interacts with. In the example depicted in FIG. 7B, the information aggregation system 700 detects that the input name (e.g., Tom Doe) is related to another name that was not input to the first input area (e.g., Amanda Towns). The relationship between the two names may be detected by, for example, discovering that Tom Doe commonly works on projects with Amanda Towns within the collaboration service. Once a related name is discovered, additional recursive searches may be performed (e.g., the information aggregation system 700 may search for the name "Amanda Towns" within a directory to discover an email address, and so on).

As depicted in FIG. 7B, the information aggregation system 700 may further recommend tasks using information discovered during a recursive search process. For example, if names are determined to be related to the text string 714, the information aggregation system 700 may recommend scheduling a meeting between the discovered people. The information aggregation system 700 may further search through a public calendar belonging to the recommended people and may recommend a meeting date and/or time (e.g., in the calendar categorization area 708c). In this way, the information aggregation system 700 may autonomously gather, recommend, and/or present relevant information to a user without the need for lengthy context switching.

Though not input directly to the first input area 706a, related links may be added to the link categorization area 708g. For example, as described herein, the information aggregation system 700 may search through an external application (e.g., the external application corresponding to Ticket 3684) and may detect other related content (e.g., Tickets 7634 and 8123). In many embodiments, the information aggregation system 700 may search for common language and/or keywords present in additional content present in the external application. Once a threshold similarity between other related content and the input content (e.g., link 714a) is detected, the information aggregation system 700 may provide related links to the link categorization area 708g even through the related links were not provided directly to the first input area 706a and/or were not directly present within the content to which link 714a refers.

FIG. 7C may correspond to the flowchart depicted in FIG. 6 and depicts an example graphical user interface when external content is gathered from an external application. FIG. 7C displays the same text string 714 as in FIGS. 7A and 7B. However, instead of information from the text string 714 being extracted directly into a respective categorization area, the text string 714 is analyzed and terms within the text string 714 are used to search external applications.

In the embodiment depicted in FIG. 7C, a name 714c may be used to search an external email service (e.g., the email service 112 in FIG. 1). After a search using the name 714c in an external email service is completed, a contact card 708a1, as presented in the stakeholders categorization area 708a may be discovered and may be presented visually to a user of the information aggregation system 700. In addition to a name 714a, the contact card 708a1 may also include a phone number, an email address, a picture, and the like. Even though much of the information within the contact card 708a1 was not presented within the first input area 706a, the search of the external email service could obtain and present relevant data.

Similarly, the name 714c may also be used to search an associated chat service (e.g., the chat service 104 depicted in FIG. 1). If a match within the associated chat service is found, the information aggregation system 700 may create a link to a messaging client 708d1. In this way, a user of the information aggregation system 700 may be able to directly message a relevant user without opening the chat service directly.

Also in the embodiment depicted in FIG. 7C, a task 714d may be used to search a collaboration service (e.g., the collaboration service 110 in FIG. 1) to obtain a company manual that provides steps for a certain task. In this example, the task 714d may be used to discover a link to a word document related to the task 714a. In this way, a user of the information aggregation system 700 may be able to easily gather necessary information without manually searching through a number of different services.

Similarly, the date 714b may be used to search a calendar service. If a match using the date 714b is found, the information aggregation system 700 may include additional appointments 708c1 which occur on the same day as the date 714b. In this way, a user of the information aggregation system 700 may be able to look at relevant calendar appointments without opening up a separate calendar/appointment tool.

The link 714a may be used to search a project management service (e.g., the project management service 108 depicted in FIG. 1). In the depicted example, the link 714a (Ticket 3684) may be used to look up a reference to the ticket directly within the appropriate external application. In this way, a user of the information aggregation system 700 may be able to open links to an external service within the graphical user interface itself.

Figure 8A:
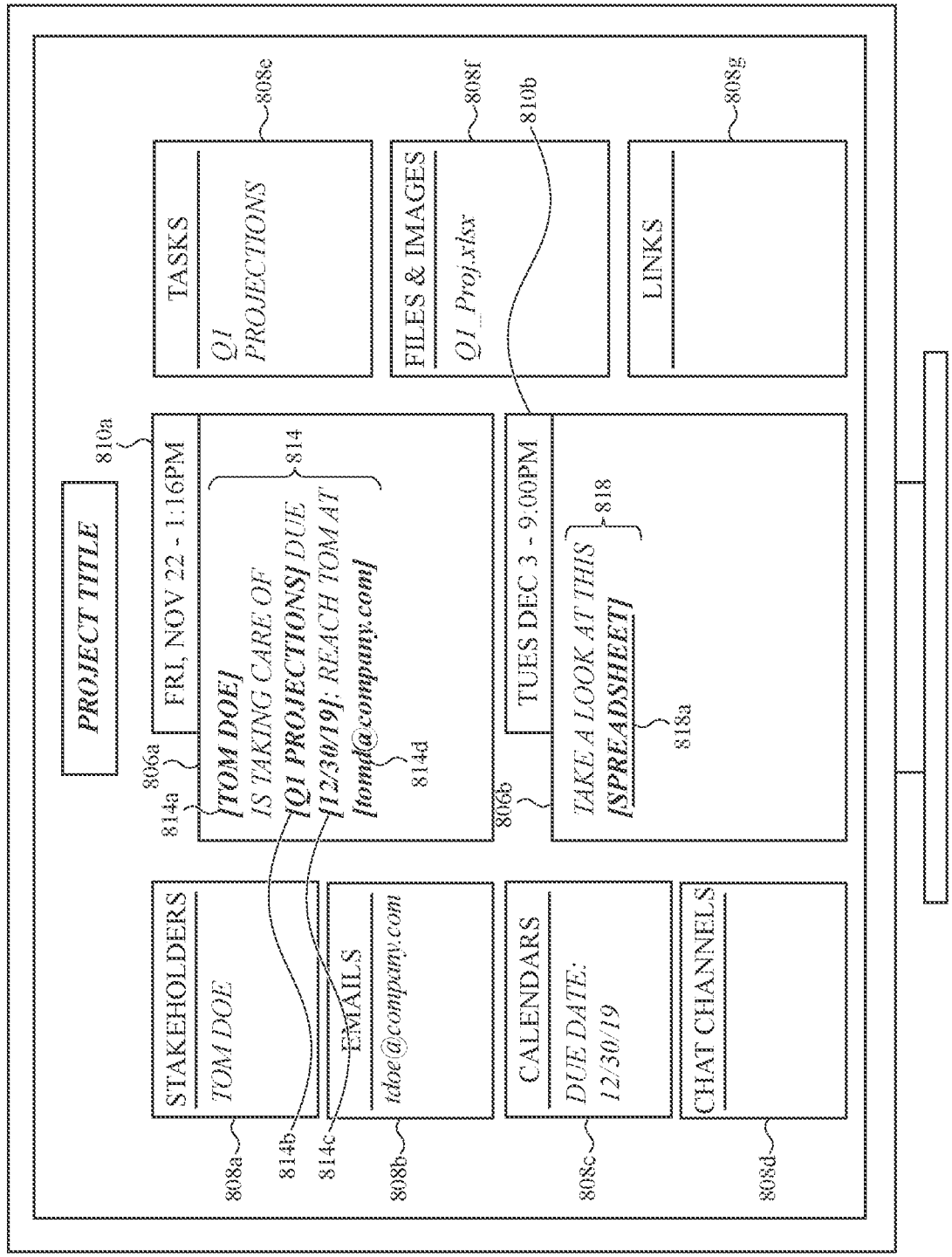
FIG. 8A depicts an example graphical user interface rendered by a display in an information aggregation system and in accordance with an example versioning operation of an information aggregation system, such as described herein.
Figure 8B:
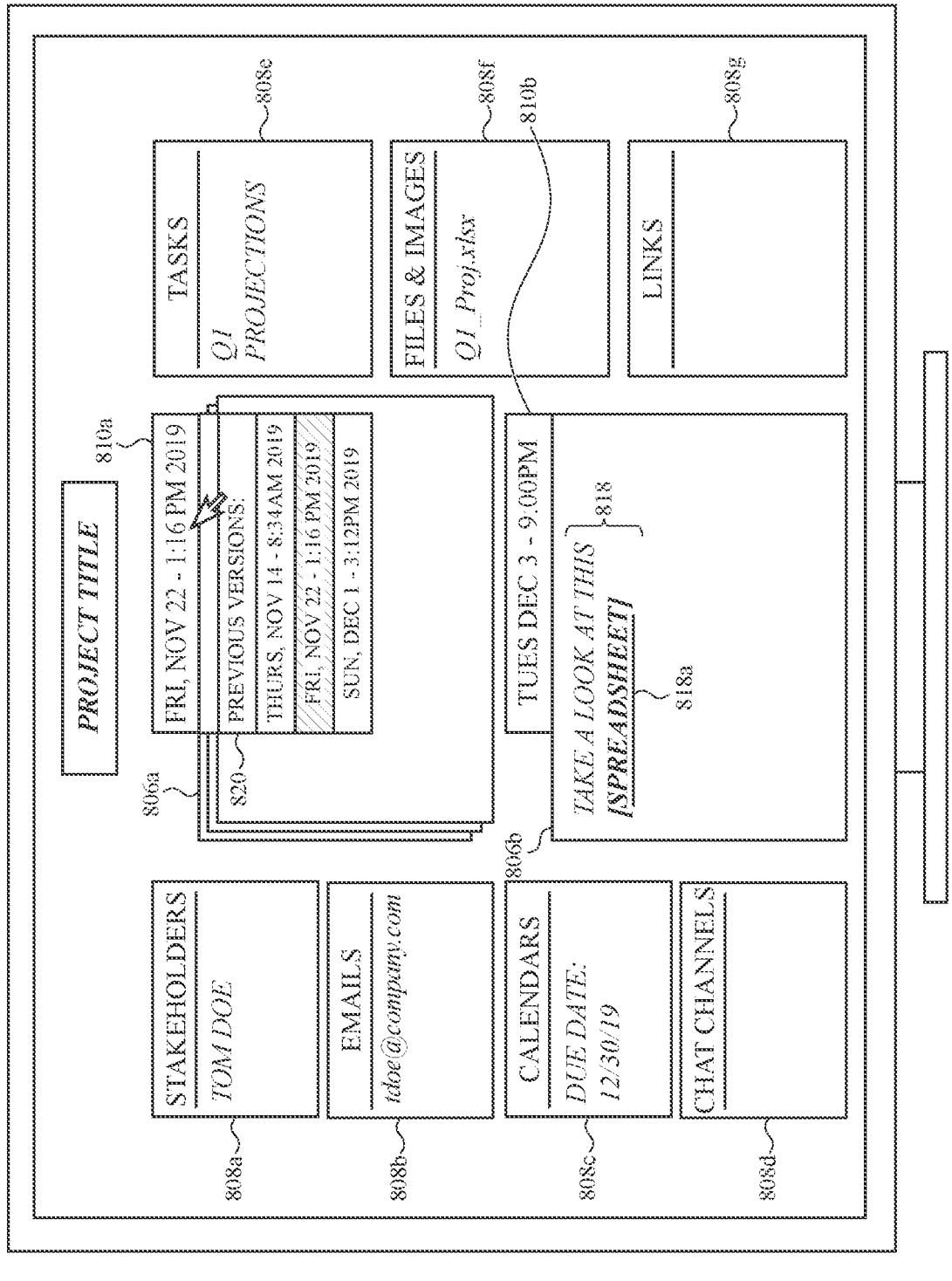
FIG. 8B depicts a versioning operation within the example graphical user interface of FIG. 8A, such as described herein.
Figure 8C:
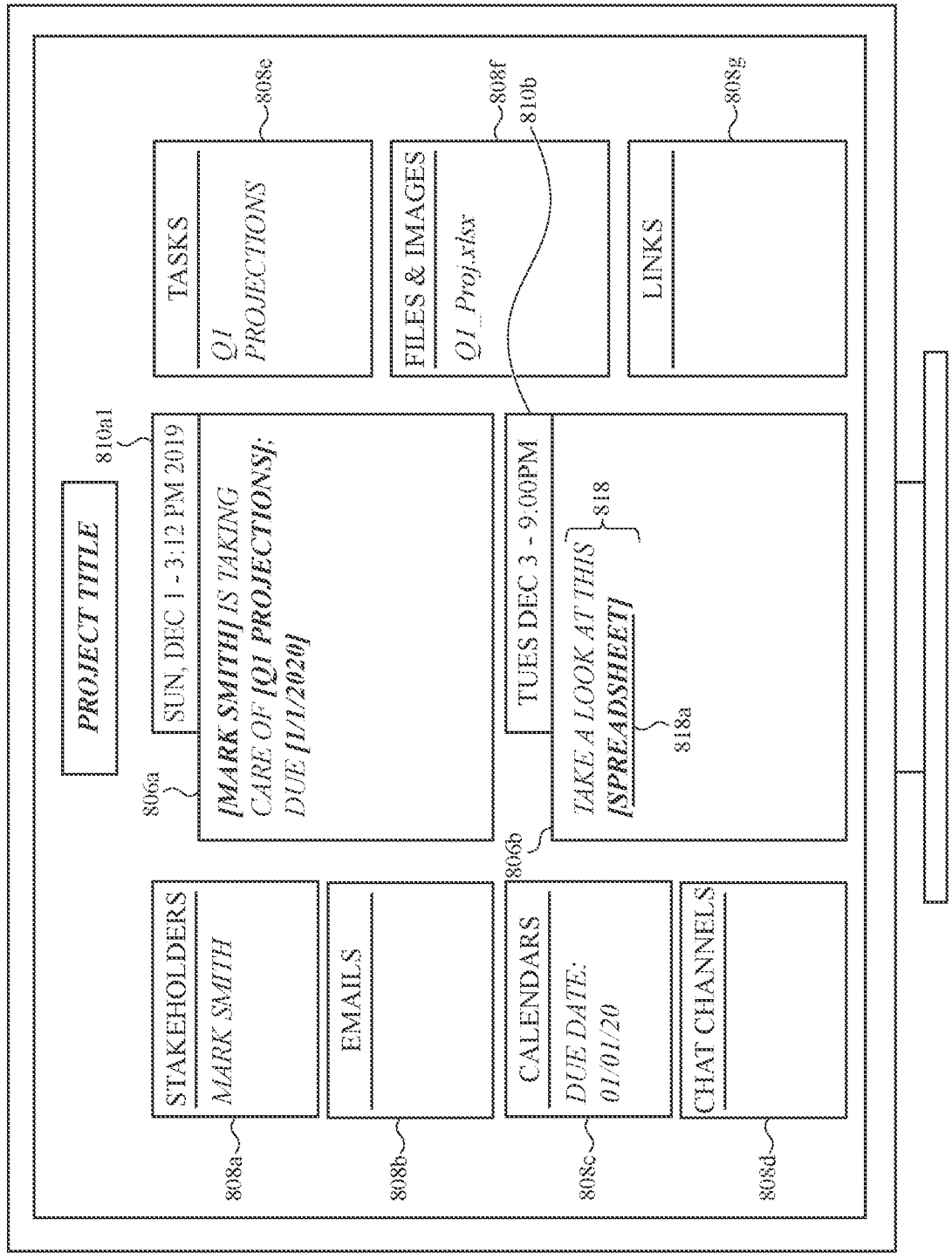
FIG. 8C depicts the example graphical user interface of FIG. 8A after a user selects a different version of an input area, such as described herein.

FIGS. 8A-8C depict an example of a versioning operation of an information aggregation system 800. The embodiment disclosed in FIGS. 8A-8C may largely correspond to the embodiments depicted in FIGS. 4, and 7A-7C.

In FIG. 8A, an example showing a situation where a user inputs a first text string 814 is depicted. The first text string 814 may comprise a number of information types detected by a data detection operation including a name 814a (Tom Doe), a task 814b (Q1 Projections), a date 814c (12/30/19), and an email address 814d (tomd@company.com). As discussed herein, each of these information types may be visually displayed in a respective categorization area as shown in FIG. 8A. Further, a second input area 806b may contain a second text string 818 containing a spreadsheet file 818a. As discussed with respect to FIGS. 7A-7C, both the recognized information types from the first text string 814 (corresponding to 814a-d) and the recognized information types from the text string 818 (corresponding to 818a) may be visually presented to a user in a respective categorization box.

FIG. 8B depicts an example operation of switching between versions of an input area in a graphical user interface. After inputting information into a first input area 806a, a timestamp 810a may be created. Since the first input area 806a is editable, a user may come back at a later time and delete, add, and/or move data within the input area 806a. When such data is changed, a new timestamp is created and is associated with the edited data in the first input area 806a. This additional timestamp and associated content may be referred to as a new version of the first input area 806a. The existence of additional versions may be depicted visually by windows (e.g., as depicted in FIG. 8B) positioned behind the first input area 806a in the graphical user interface.

Once multiple versions of the first input area 806a are created, a user may use an input device (e.g., a mouse and cursor) to click (e.g., right-click) on the timestamp 810a. Once the user clicks on the timestamp 810a, an option window 820 may appear. The option window 820 may contain a list of all versions of the first input area 806a (depicted in FIG. 8B as associated with specific timestamps). In this way, a user of the information aggregation system 800 may switch between different versions of the first input area 806a (e.g., the windows behind the input area 806a in FIG. 8B).

FIG. 8C depicts the information aggregation system 800 at a time a version (e.g., corresponding to the windows behind the input area 806a in FIG. 8B) with a timestamp 810a1 is selected. In the example shown in FIG. 8C, stakeholder categorization area 808a contains a reference to "Mark Smith" rather than "Tom Doe" as depicted in FIG. 8A. In light of this difference (and the omission of the email shown in FIG. 8A), the surrounding categorization areas 808b-g update to display only the selected information. Of particular note is that the second input area 806b is unchanged between FIG. 8A and FIG. 8C and so the content within the file & image categorization area 808*f* remains unchanged. In this way, the surrounding categorization areas 808*a*-*g* may be updated in real-time to display only data that is currently selected and/or displayed within the input areas.

With reference to spreadsheet file 818*a* as depicted in FIG. 8A, a file extension may be depicted in the associated categorization area rather than what is input into the second input area 806*b* (e.g., a hyperlink or a natural language description). The file extension may be clickable by a user and may direct the user to a location of the file.

Figure 9A:
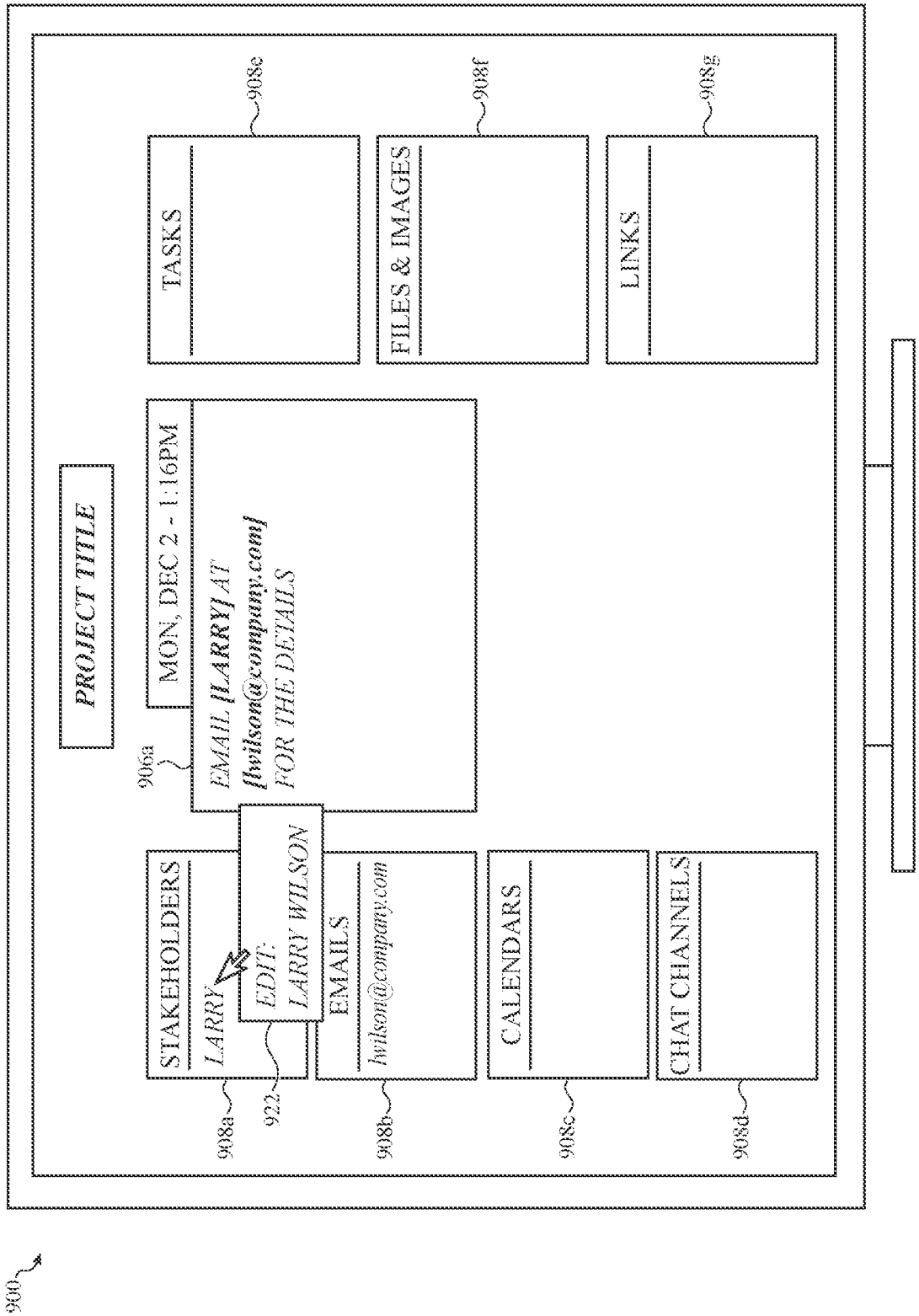
FIG. 9A depicts an example graphical user interface rendered by a display in an information aggregation system where a user may edit information within a categorization area, such as described herein.
Figure 9B:
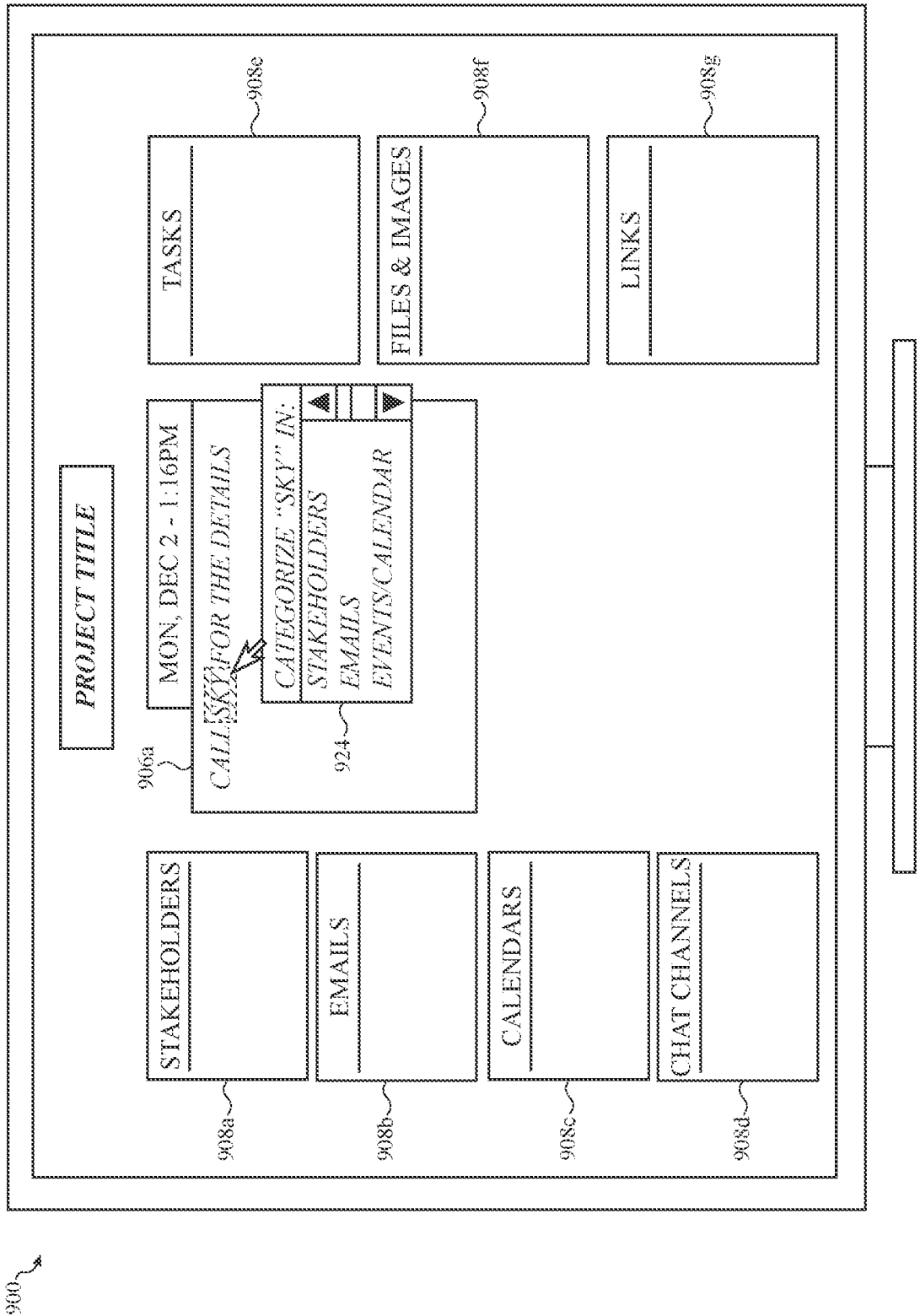
FIG. 9B depicts an example graphical user interface rendered by a display in an information aggregation system where a user may manually categorize information inserted into an input area, such as described herein.

FIGS. 9A and 9B depict an example of a user-editable operation of an information aggregation system 900. In the example depicted in 9A, a first name ("Larry") is input to an input area 906*a* without an associated last name. As discussed herein, a data detection operation may recognize that the inputted text "Larry" references a name and may display "Larry" within a stakeholders categorization area. However, since there is no last name present, the information aggregation system 900 may be unable to populate a last name. To rectify this, the information aggregation system may include an openable edit window 922 that allows a user to edit information displayed in any categorization area 908*a*-*g*. In the example shown in FIG. 9A, a user may insert a last name ("Wilson") to provide additional context to the categorization areas.

In addition to the above embodiment, the information aggregation system 900 may autonomously search external applications (as discussed with respect to FIG. 6, above) using the provided first name (e.g., Larry) as a search term. After a search, the information aggregation system 900 may predict the proper last name for the input name. In such an operation, a user of the information aggregation system 900 may still manually edit the name provided in the categorization area 908*a* if desired.

In many embodiments, the information aggregation may sweep the contents of all other categorization areas and/or any other searchable data sources on a client device to attempt to automatically populate a last name when none is directly provided by a user. For example, in another input area, the user may have used the name "Larry Wilson." In this case, the information aggregation system 900 may determine that whenever a user types "Larry," the associated person is "Larry Wilson" and may automatically populate "Larry Wilson" in a categorization area whenever "Larry" is used. In some embodiments, the information aggregation system 900 may be able to access a contacts list outside of the information aggregation system 900 and may associate "Larry" with a "Larry Wilson" in a contacts list. The above example is not limited only to names and may include automatically completing and/or associating with any other data type such as associating an email address with a name, automatically completing a task, linking calendar dates to events, and the like.

FIG. 9B depicts an instance where a data detection operation of the information aggregation system 900 is unable to determine a data type of a piece of input content. In this scenario, a user may highlight a portion of the content input to an input area 906*a* (e.g., "Sky" in FIG. 9B) and may select a category for the highlighted portion by, for example, right clicking and bringing up a categorization menu 924. In this way, the categorization areas may be populated either automatically using a data detection operation and/or a natural language processor or manually by a user.

Figure 10A:
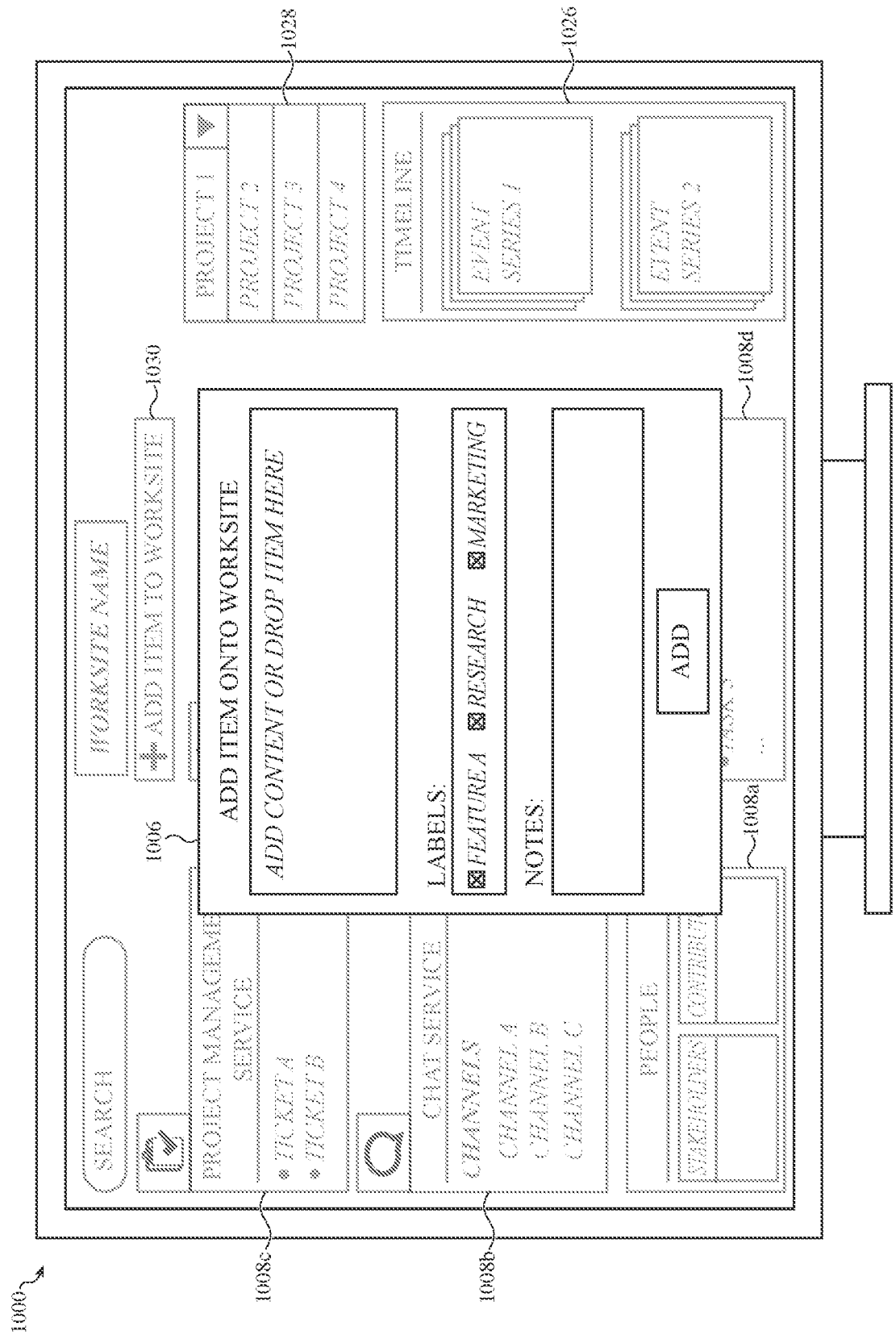
FIG. 10A depicts an embodiment of a graphical user interface, including an input area, rendered by a display in an information aggregation system, such as described herein.
Figure 10B:
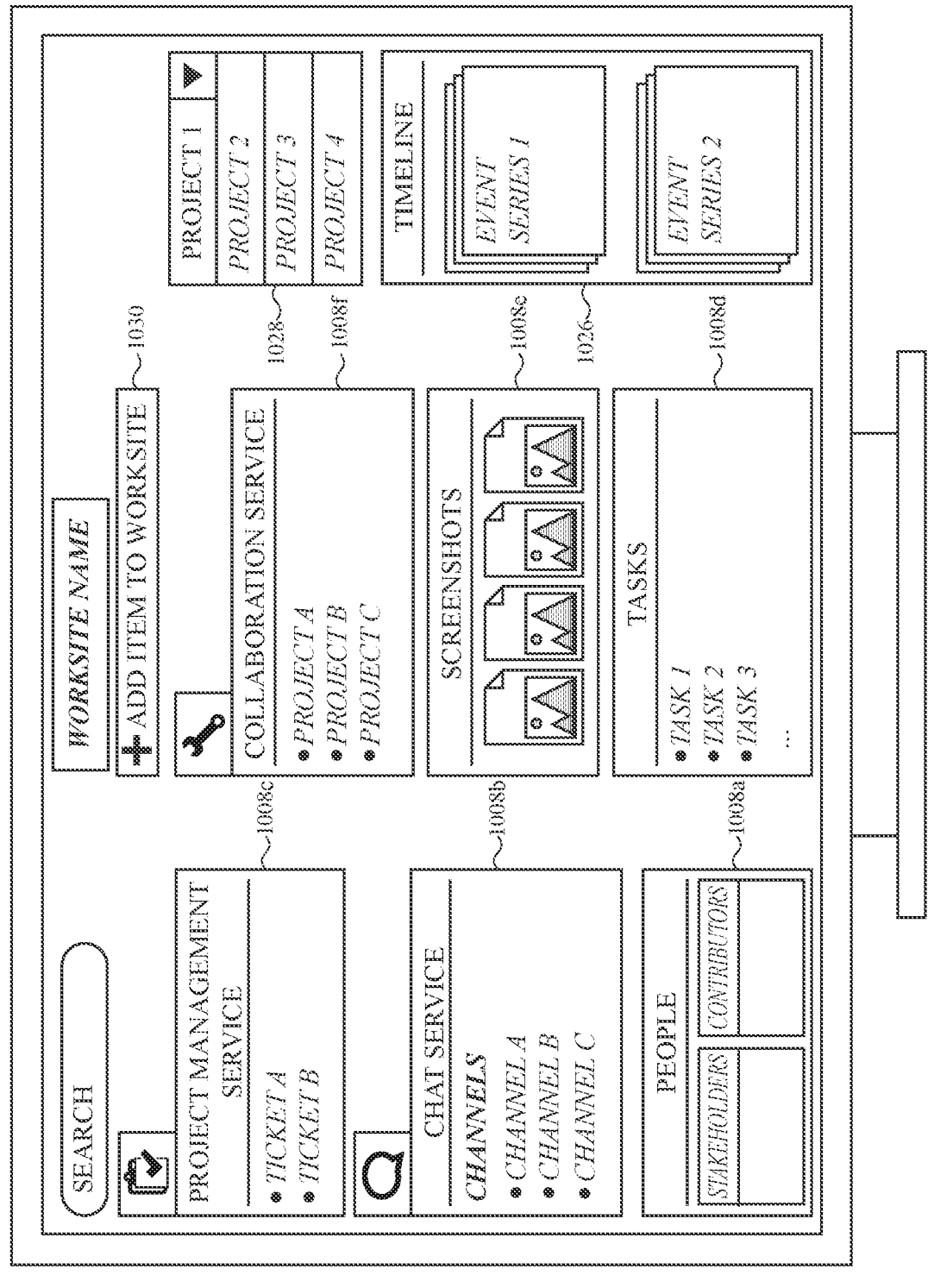
FIG. 10B depicts an embodiment without the input area as depicted in FIG. 10A, such as described herein.

FIG. 10A depicts an embodiment of a graphical user interface for an information aggregation system 1000. The information aggregation system 1000 includes a pop-up input area 1006 and categorization areas 1008*a*-*f* (displayed in the background in FIG. 10A and in the foreground in FIG. 10B). Also depicted in FIG. 10 are a timeline 1026, a project switcher 1028, and a new addition graphic 1030. The operation of the information aggregation system 1000 is largely similar to that shown in previous embodiments, except as discussed below.

In FIG. 10A, the pop-up input area 1006 may accept a user input, as discussed herein. In this embodiment, the pop-up input area 1006 is displayed over a background portion including categorization areas 1008*a*-*f*. In this way, the pop-up input area 1006 may only be provided to a user when needed, in order to provide more space within the graphical user interface for other visual elements (e.g., categorization areas 1008*a*-*f*). In addition to automated data detection operations configured to analyze and organize inputted data that corresponds to known data types, the pop-up input area 1006 may additionally be provided with a labeling mechanism and a note field. The labeling mechanism may allow a user to manually input organizational information so as to provide additional context to inputted information. In the example presented in FIG. 10A, the terms "Feature A," "Research," and "Marketing" are provided within the labeling mechanism. These terms may additionally be associated with a unique categorization area which may be created once a user-generated label is assigned to a user input. For example, if the user inserts content into the pop-up input area 1006, types "Marketing" into the labeling mechanism, and presses the "Add" button, the content inserted into the pop-up input area 1006 may be provided in a categorization area labeled "Marketing." This may allow a user to easily create and populate additional categorization areas. This process may operate adjacent to the data detection operations discussed herein.

The information aggregation system 1000 may additionally be provided with machine learning techniques to learn from a user's habits and to begin autonomously organizing inputted data in association with the learned habits. For example, if a user often labels any piece of inputted content containing the name "Cheryl" with the term "Marketing," the information aggregation system 1000 may begin automatically labeling any input containing the name "Cheryl" with the term "Marketing." In this way, the information aggregation system 1000 may develop in accordance with a user's habits and manner of operation.

The pop-up input area 1006 may additionally be provided with a note area. This note area may permit a user to type a brief statement about the associated content within the pop-up input area 1006. The notes inputted in the note area may be used as metadata or may be otherwise available to a user when pulling up content from the pop-up input area 1006.

The information aggregation system 1000 may additionally be provided with a project switcher 1028. The project switcher 1028 may be, for example, a drop-down bar and may allow a user to switch between different projects. In some embodiments, a selected project only contains data input into the pop-up input area 1006 associated with that project. In this way, different projects may be separated from each other so that only information associated with a relevant project is displayed within associated categorization areas.

FIG. 10B depicts the embodiment displayed in FIG. 10A without the pop-up input area 1006. Notably, the embodiment displayed in FIG. 10B includes a timeline 1026. The timeline 1026 may include all of the information input into the pop-up input area 1006, including various versions of the inputted information (shown in FIG. 10B as a stack with a number of windows). The separate types of content of the inputted information may be displayed as separate stacks. Therefore, in the embodiment depicted in FIG. 10, user inputted content may be displayed without requiring excessive space.

Also depicted in FIG. 10B, is a number of categorization areas 1008*a-f*. The categorization areas 1008*a-f* operate similarly to previously described embodiments and, as such, duplicative description is omitted.

Categorization areas 1008*b*, 1008*c*, and 1008*f* each refer to an external application (e.g., a SaaS application). These categorization areas 1008*b*, 1008*c*, and 1008*f* may be created when, for example, a user inputs a link to a respective external application in the pop-up input area 1006. The categorization areas 1008*b*, 1008*c*, and 1008*f* may additionally be visually presented such that they correspond graphically to a design of the respective external application. For example, if a user pastes a link to a chat service in the pop-up input area 1006, the information aggregation system 1000 may detect that the link is a link to a known chat service and may provide a categorization area 1008*b* that displays a logo/design of the known chat service. In addition, the categorization area 1008*b* may contain the content contained within a location where the link leads. This operation, and other similar operations, are discussed in-depth with reference to FIG. 11.

The information aggregation system 1000 may analyze input content to determine the presence of a link and/or a reference to an external application. The information aggregation system 1000 may also determine a likelihood that input content corresponds to an external application and may determine that input content does correspond to the external application when a threshold similarity value is met. The information aggregation system 1000 may initiate a search within the external application and may direct a client device and/or a graphical user interface to display and/or present, within any of the categorization areas 1008*b*, 1008*c*, and 1008*f*, external content found within the external application.

The manner in which the categorization areas 1008*b*, 1008*c*, and 1008*f* may display external content obtained from an external application will now be described. In some embodiments, a user input received via the pop-up input area 1006 may be analyzed by the information aggregation system 1000 to detect the presence of a content portion(s) associated with an external application. The content portion(s) may be analyzed by, for example, a data detection operation and the information aggregation system 1000 may determine that the extracted content portion(s) corresponds to an external application (e.g., a social media application, a chat application, a project management application, and the like).

The manner of analysis of the content portion is not limited to any particular method. In some embodiments, the information aggregation system 1000 may detect the presence of a link to an external application (e.g., a hyperlink to a project management application) and may determine that the content portion is associated with the referenced external application (e.g., an express reference to an external application). In overlapping and/or alternative embodiments, the information aggregation system 1000 may analyze the content portion to determine a likelihood that the content portion refers to a particular external application (e.g., an implied reference to an external application). In such an implied reference, the information aggregation system 1000 may look for the presence of, for example, user names, ticket numbers, email addresses, and the like.

Once the context information is identified, the context information may be used to initiate a search within the identified external application. Once external content corresponding to the context information is found within the identified external application, the external content may be presented and/or displayed within an associated application portal/categorization area such as described herein.

In an example, a user inserts a user name (e.g., user12-pms) into the pop-up input area 1006. The information aggregation system 1000 may determine that input text including a "-pms" string (e.g., context information) is associated with the project management service corresponding to the project management service categorization area 1008*c*. The information aggregation system 1000 may then initiate a search utilizing the user name (user12-pms) within the project management service. Once information (e.g., external content) corresponding to the user name is found within the external application, the found information (e.g., found external content) may be displayed, on a client device, within the project management service categorization area 1008*c*.

Figure 11:
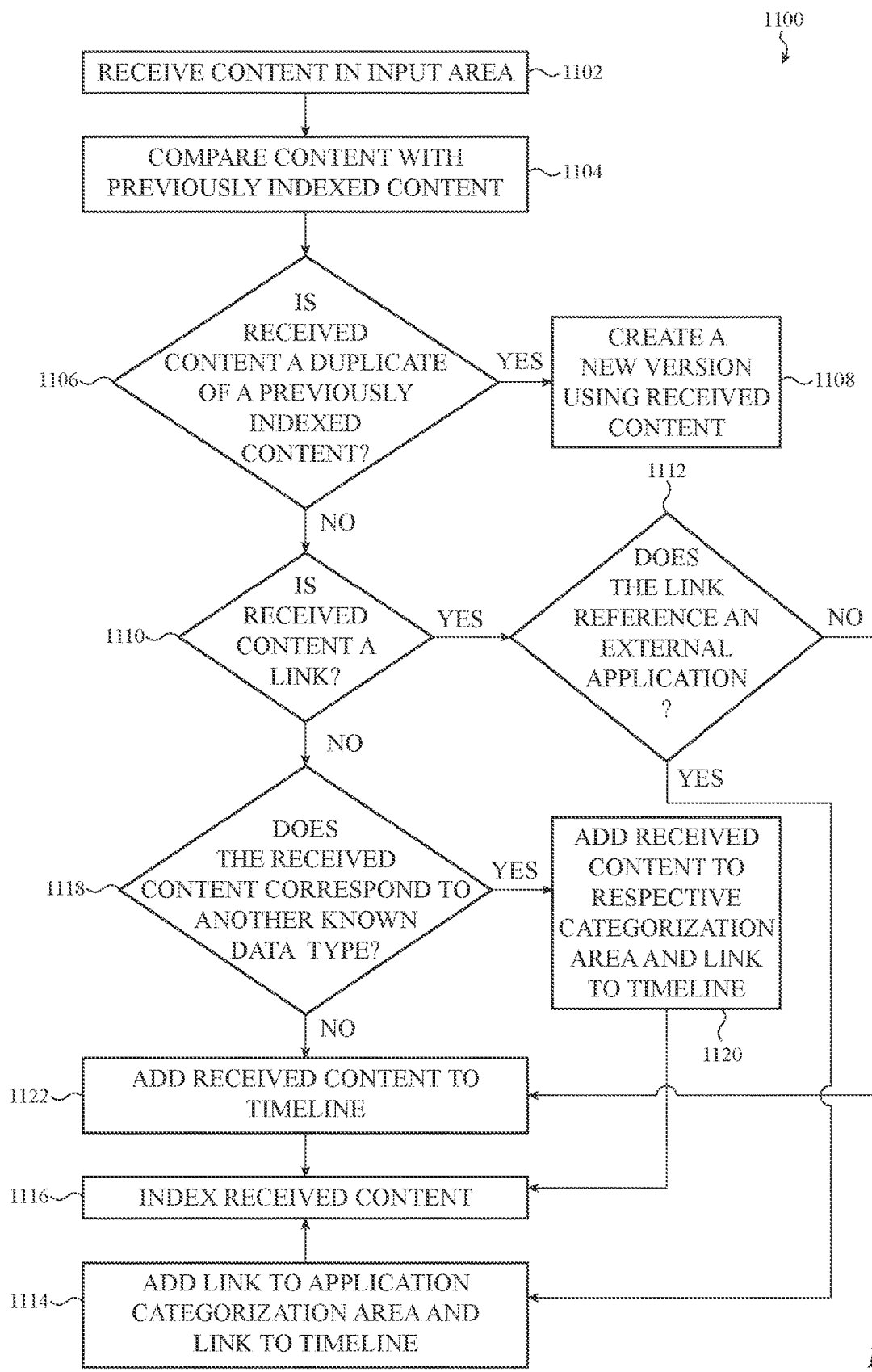
FIG. 11 is a flowchart that depicts an example method including operations of an information aggregation system, the example operations related to scenarios in which a user inputs information of various types into an input area, such as described herein.

FIG. 11 is a flowchart that depicts an example method 1100 of an information aggregation system. Particularly, the method 1100 considers scenarios where a duplicate item is inserted into an input area and where a link to an external service is inserted into the input area. The method 1100 may be performed by any hardware or software, whether virtual or otherwise, such as described herein. In one example, the method 1100 is performed, in whole or in part, by a categorization service, such as described with reference to FIG. 2.

At step 1102, the method 1100 initiates an operation that receives content in an input area. As discussed herein, the input area may be the pop-up input area 1006 (as depicted in FIG. 10), the input areas 406*a* and 406*b* (as depicted in FIG. 4), or any other appropriate input area configured to receive a user content. At step 1102, the received content may be any type of content including, but not limited to, text, an image, a link, an animated picture, a video, and an audio clip.

At step 1104, the method 1100 initiates an operation that compares the content inserted into the input area at step 1102 with previously input content (e.g., content input in a previous operation). Any manner of comparison may be used. In one example, if text is received in the input area at step 1102, step 1104 may correspond to a text analysis process that looks for similar or equivalent, for example, words, phrases, and/or sentence structure between two or more compared samples. In another example, if an image is received in the input area at step 1102, an image recognition process may be done between two or more images to determine a possible similarity.

Step 1104 may be skipped in instances where no content has previously been received in the input area at step 1102. In this situation, the method 1100 goes directly from step 1102 to step 1110, as discussed herein.

At step 1106, the method 1100 initiates an operation that determines whether the compared content in step 1104 is a substantial duplicate of a previously indexed input. In some embodiments, a threshold similarity value may be used to determine if the compared content results in a determination of a substantial duplication. For example, compared content may share identical words and/or phrases, but the words and/or phrases present in the received content may be in a different order than present in the previously indexed content. In this case, even if the compared content is not identical, the threshold similarity value may still be met and the method 1100 may initiate an operation that considers the compared content to be a substantial duplication. In some embodiments, the threshold similarity value may be editable by, for example, an administrator or a user.

If, in step 1106, the compared content is considered to be substantially similar, the method 1100 initiates an operation that creates a new version of the previously indexed input at step 1108. As discussed herein, a new version may be visually displayed to a user by, for example, graphically displaying a stack of boxes in a graphical user interface (see, for example, timeline 1026 in FIG. 10B). The new version may be associated with a new timestamp corresponding to a time in which the received content was inserted into the input area at step 1102.

If, in step 1106, the compared content is not considered to be substantially similar, the method 1100 initiates an operation that begins determining what kind of content was inserted into the input area at step 1102. In some embodiments, the method 1100 initiates an operation that may first determine, at step 1110, whether the received content was a link to a virtual location. Any kind of link recognition process may be used to determine whether the received content was a link. For example, the system may look for the presence of a top-level domain (e.g., .com, .net, .org). In another, or the same, example, the system may look for a reference to a location within a user's hard drive (e.g., references to a C:// drive). In yet another, or the same, example, the system may determine whether the inserted link is a reference to an external application.

If, in step 1110, the received content is determined to be a link, the method 1100 initiates an operation that considers, at step 1112 whether the link references an external application (e.g., SaaS software). The same or similar process as described above with reference to step 1110 may be used to determine whether the link references an external application. In some embodiments, the received content may be determined to reference an external application without including a link. For example, the received content may be of a format that is commonly associated with a particular external application (e.g., a specific format of a ticket number known to correspond to a particular project management service).

If the link is determined to reference an external application, the link is added to an application categorization area and is linked to a timeline as described in step 1114. The associated application categorization area may be a preexisting categorization within the graphical user interface (as shown, for example, in FIG. 10) or may be created only after the identity of the referenced external application is determined.

Once the link is added to the application categorization area, the specific application categorization area may be automatically edited to correspond to the style of the corresponding external application. For example, if the link is determined to link to a chat application, the application categorization area in which the link is sorted may change visually to correspond to the color-scheme and/or design elements of the chat application. Further, the options visually displayed within the application categorization area may correspond to a menu of the chat application. If the external application to which the link directs is unknown, a default style and menu may be displayed as the application categorization area.

After step 1114, the received content may be indexed in order to provide for increased search functionality, as described herein.

Referring to step 1112, if the method 1100 determines that the received link is not a reference to an external application (e.g., if the received link is merely a link to a location on a hard drive or a link to a webpage), the link is added to a generic "link" categorization area at step 1120. The generic "link" categorization area may display all inserted links, and/or content present at a location to which the link directs, that do not reference an external application (e.g., SaaS applications).

After step 1120, the received content may be indexed in order to provide for increased search functionality, as described herein.

Going back to step 1110, if the method 1100 determines that the received content is not a link, the method 1100 may then determine if the received content corresponds to another known data type at step 1118. For example, the method 1100 may determine that the received content is a name or calendar input, as discussed herein.

If the received content does not correspond to a known data type, the received content is stored in a timeline without being copied and/or referenced in a separate categorization area, as described with reference to step 1122.

If the received content does correspond to a known data type, the received data content is stored in a timeline and, in addition, a copy and/or reference of the known data type is added to a respective categorization area, as described with reference to step 1120.

Regardless of whether the received content goes through step 1122 or 1120, the received content is indexed at step 1116 to provide for increased search functionality.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A computer-implemented method for generating context-based content in a virtual workspace, the computer-implemented method comprising:
   at a client device, causing generation of a graphical user interface associated with a particular project, the graphical user interface including an input area and a set of application portals, each application portal of the set of application portals corresponding to a respective external application of a set of external applications;
   receiving, at the input area of the graphical user interface, a user input;

analyzing the user input to determine a first content portion and a second content portion;

determining a first information type for the first content portion by performing a first textual analysis of the first content portion;

identifying a first external application from the set of external applications that corresponds to the first information type of the first content portion;

determining a second information type for the second content portion by performing a second textual analysis of the second content portion, the second information type different from the first information type;

identifying a second external application from the set of external applications that corresponds to the second information type of the second content portion;

analyzing the virtual workspace to identify context information, the context information including project information of the particular project and distinct from the first content portion and the second content portion;

using the first content portion and the context information, constructing a first limited search to be performed within the first external application;

causing performance of the first limited search within the first external application to identify first external content associated with the particular project;

using the second content portion and the context information, constructing a second limited search to be performed within the second external application;

causing performance of the second limited search within the second external application to identify second external content associated with the particular project; and directing the client device to display the first external content within a first application portal of the set of application portals, the first application portal associated with the first external application, and to display the second external content within a second application portal of the set of application portals, the second application portal associated with the second external application.

2. The computer-implemented method of claim 1, wherein:

the user input is a first user input; and the computer-implemented method further comprises:

associating the first user input with a first timestamp, the first timestamp corresponding to a first time when the first user input is input to the input area;

storing the first user input and the first timestamp as a first version;

receiving a second user input via the input area of the graphical user interface;

associating the second user input with a second timestamp, the second timestamp corresponding to a second time when the second user input is input to the input area; and storing the second user input and the second timestamp in a second version.

3. The computer-implemented method of claim 2, wherein:

when a user selects the first version, information associated with the first user input is displayed within at least one application portal of the set of application portals; and when the user selects the second version, information associated with the second user input is displayed within the at least one application portal of the set of application portals.

4. The computer-implemented method of claim 1, wherein the user input is at least one of a string of text, a hyperlink, a digital file, or an image.

5. The computer-implemented method of claim 1, wherein:

a first design of the first application portal within the graphical user interface mimics a first user interface design of the first external application; and a second design of the second application portal within the graphical user interface mimics a second user interface design of the second external application.

6. The computer-implemented method of claim 1, wherein:

the first content portion is converted into a first format when displayed within the first application portal, the first format corresponding to a first appearance of the first external application; and the second content portion is converted into a second format when displayed within the second application portal, the second format corresponding to a second appearance of the second external application.

7. The computer-implemented method of claim 1, wherein:

the first information type corresponds to a ticket; and the first external application is an issue tracking system.

8. The computer-implemented method of claim 1, wherein:

the second information type is at least one of an email address or an email; and the second external application is an email client.

9. The computer-implemented method of claim 1, wherein the first limited search is only performed within the first external application and is not performed within any other external application of the set of external applications.

10. A computer-implemented method for providing an organizational tool, the computer-implemented method comprising:

at a client device, causing generation of a graphical user interface associated with a particular project, the graphical user interface including an input area and a set of application portals, each application portal of the set of application portals corresponding to a respective external application of a set of external applications;

at a first time, receiving a first user input via the input area of the graphical user interface;

associating the first user input with a first timestamp, the first timestamp corresponding to the first time;

analyzing the first user input to determine, from the first user input, a first content portion;

determining a first information type for the first content portion by performing a first textual analysis of the first content portion;

selecting a first external application from the set of external applications based on the first information type of the first content portion;

analyzing the graphical user interface to identify context information, the context information including project information of the particular project;

using the first content portion and the context information, initiating a first limited search within the first external application to identify first external content associated with the particular project;

at a second time, receiving a second user input via the input area of the graphical user interface;

associating the second user input with a second timestamp, the second timestamp corresponding to the second time;

analyzing the second user input to determine, from the second user input, a second content portion;

determining the second content portion corresponds to the first external application;

using the second content portion and the context information, initiating a second limited search within the first external application to identify second external content associated with the particular project;

directing, when a user selects the first timestamp associated with the first user input, the client device to display the first external content within the first application portal; and directing, when the user selects the second timestamp associated with the second user input, the client device to display the second external content within the first application portal.

11. The computer-implemented method of claim 10, wherein:

the first user input is stored in a first version block;

the second user input is stored in a second version block; and the first version block and the second version block are presented within the graphical user interface in a stacked form.

12. The computer-implemented method of claim 10, further comprising:

analyzing the second user input to determine a similarity between the first user input and the second user input;

determining a threshold similarity value;

determining the similarity between the first user input and the second user input is above the threshold similarity value;

storing the first user input in a first version block;

storing the second user input in a second version block; and directing the client device to display the first version block and the second version block in a stacked form within the graphical user interface.

13. The computer-implemented method of claim 10, further comprising:

analyzing the second user input to determine a similarity between the first user input and the second user input;

determining a threshold similarity value;

determining the similarity between the first user input and the second user input is below the threshold similarity value;

storing the first user input in a first task block;

storing the second user input in a second task block; and directing the client device to display the first task block and the second task block as separate task blocks within the graphical user interface.

14. The computer-implemented method of claim 10, wherein:

the first content portion is a first hyperlink to the first external application, the first hyperlink leading to a first location in the first external application that contains the first external content; and the second content portion is a second hyperlink to the first external application, the second hyperlink leading to a second location in the first external application that contains the second external content.

15. The computer-implemented method of claim 10, wherein the first user input and the second user input are indexed into at least one of a primary index and a secondary index.

16. The computer-implemented method of claim 15, further comprising:

directing the client device to display a search area, the search area configured to receive a search request from the user;

receiving the search request via the search area;

initiating a third search, the third search searching at least the first user input, the second user input, the first external content, and the second external content; and directing the client device to display segments of at least the first user input, the second user input, the first external content, and the second external content that correspond to the search request.

17. A system for hosting an organizational tool, the system comprising:

a storage medium that stores instructions; and a processor that executes the instructions to:

cause a client device to display a graphical user interface, the graphical user interface associated with a particular project and including an input area configured to receive a user input and a set of application portals, each application portal of the set of application portals corresponding to a respective external application of a set of external applications;

analyze the user input to determine, from the user input, a first content portion and a second content portion;

determine a first information type for the first content portion by performing a first analysis of the first content portion;

identify a first external application from the set of external applications that corresponds to the first information type of the first content portion;

determine a second information type for the second content portion by performing a second analysis of the second content portion, the second information type different from the first information type;

identify a second external application from the set of external applications that corresponds to the second information type of the second content portion;

identify context information corresponding to the particular project, the context information including project information related to the particular project;

use the first content portion and the context information to initiate a first limited search within the first external application using the context information;

use the second content portion and the context information to initiate a second limited search within the second external application;

provide first external content to a first application portal of the set of application portals, the first external content gathered from the first external application in response to the first limited search; and provide second external content to a second application portal of the set of application portals, the second external content gathered from the second external application in response to the second limited search.

18. The system of claim 17, wherein:

the user input is a first user input;

the input area is further configured to receive a second user input; and the processor further executes the instructions to:

generate a timeline in the graphical user interface, the timeline configured to store the first user input and the second user input;

provide the first user input to a first block in the timeline of the graphical user interface; and provide the second user input to a second block in the timeline of the graphical user interface.

19. The system of claim 18, wherein the processor further executes the instructions to:
- determine that the first user input and the second user input share a threshold similarity;
- stack the first block in the timeline with the second block in the timeline; and
- cause the client device to display a stack comprising the first block and the second block.

20. The system of claim 18, wherein the processor further executes the instructions to:
- determine that the first user input and the second user input do not share a threshold similarity;
- separate the first block in the timeline and the second block in the timeline; and
- cause the client device to display the first block and the second block as separate elements.

* * * * *